US012745155B2

(12) United States Patent
Ali et al.

(10) Patent No.: US 12,745,155 B2
(45) Date of Patent: Sep. 22, 2026

(54) AI/ML MODEL FUNCTIONALITY IN HANDOVER SCENARIOS

(71) Applicant: Nokia Technologies Oy, Espoo (FI)

(72) Inventors: Amaanat Ali, Espoo (FI); Keeth Saliya Jayasinghe Laddu, Espoo (FI); Mihai Enescu, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 483 days.

(21) Appl. No.: 18/505,373

(22) Filed: Nov. 9, 2023

(65) Prior Publication Data

US 2024/0172080 A1 May 23, 2024

Related U.S. Application Data

(60) Provisional application No. 63/426,104, filed on Nov. 17, 2022.

(51) Int. Cl.
*H04W 76/20* (2018.01)
*H04W 36/00* (2009.01)
*H04W 36/36* (2009.01)

(52) U.S. Cl.
CPC ..... *H04W 36/362* (2023.05); *H04W 36/0058* (2018.08); *H04W 76/20* (2018.02)

(58) Field of Classification Search
CPC ........... H04W 36/362; H04W 36/0058; H04W 76/20; H04W 36/08; H04W 36/0085
See application file for complete search history.

(56) References Cited

U.S. PATENT DOCUMENTS

2008/0291875 A1* 11/2008 Kang ................ H04W 36/0061 370/331

FOREIGN PATENT DOCUMENTS

EP 3979692 A1 4/2022
EP 3979692 B1 * 12/2025 .......... H04W 36/362

(Continued)

OTHER PUBLICATIONS

Notice of Allowance received for corresponding European Patent Application No. 23205779.4, dated Feb. 18, 2025, 7 pages.

(Continued)

*Primary Examiner* — Yuwen Pan
*Assistant Examiner* — Farideh Madani
(74) *Attorney, Agent, or Firm* — Carter, DeLuca & Farrell LLP

(57) ABSTRACT

An apparatus configured to: initiate performance of at least one function enabled with a first model; receive, from a source base station, at least one model compatibility configuration; determine whether the at least one function is compatible with a second model of at least one target base station based, at least partially, on the at least one model compatibility configuration; transmit, to the at least one target base station, at least one report, wherein the at least one report comprises, at least, an indication of a result of whether the at least one function is compatible with the second model of the at least one target base station; and receive, in response to the report, a conditional handover configuration, wherein the conditional handover configuration comprises, at least, an indication to at least one of: perform data collection, update the first model, or switch the first model with another model.

20 Claims, 10 Drawing Sheets

(56) References Cited

FOREIGN PATENT DOCUMENTS

| | | | | | |
|---|---|---|---|---|---|
| WO | 2022/061839 | A1 | | 3/2022 | |
| WO | WO-2022165721 | A1 | * | 8/2022 | ............ H04W 88/08 |

OTHER PUBLICATIONS

"3rd Generation Partnership Project; Technical Specification Group Radio Access Network; NR; Physical layer procedures for control (Release 17)", 3GPP TS 38.213, V17.3.0, Sep. 2022, pp. 1-260.

"3rd Generation Partnership Project; Technical Specification Group Radio Access Network; NR; Physical layer procedures for data (Release 17)", 3GPP TS 38.214, V17.3.0, Sep. 2022, pp. 1-232.

"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.

"New SI: Study on Artificial Intelligence (AI)/Machine Learning (ML) for NR Air Interface", 3GPP TSG RAN Meeting #94e, RP-213599, Agenda: 8.6.1, Qualcomm, Dec. 6-17, 2021, 6 pages.

"Msc-generator", Sourceforge, Retrieved on Dec. 6, 2023, Webpage available at : https://sourceforge.net/projects/msc-generator/.

"3rd Generation Partnership Project; Technical Specification Group Radio Access Network; NR; NR and NG-RAN Overall Description; Stage 2 (Release 17)", 3GPP TS 38.300, V17.2.0, Sep. 2022, pp. 1-210.

Extended European Search Report received for corresponding European Patent Application No. 23205779.4, dated Apr. 4, 2024, 5 pages.

* cited by examiner

700 initiate performance of at least one function enabled with a first model

710

receive, from a source base station, at least one model compatibility configuration

720

determine whether the at least one function is compatible with a second model of at least one target base station based, at least partially, on the at least one model compatibility configuration

730

transmit, to the at least one target base station, at least one report, wherein the at least one report comprises, at least, an indication of a result of whether the at least one function is compatible with the second model of the at least one target base station

740

receive, in response to the report, a conditional handover configuration, wherein the conditional handover configuration comprises, at least, an indication to at least one of:

perform data collection, update the first model, or switch the first model with another model

800 receive, from a source base station, a handover request with respect to a user equipment, in a cell of the source base station, that is performing at least one function enabled with a first model, wherein the handover request comprises at least one report, wherein the at least one report comprises, at least, an indication of whether the at least one function is compatible with a second model of the apparatus

810

determine a handover configuration for the user equipment, wherein the handover configuration comprises, at least, an indication to at least one of:

perform data collection, update the first model, or switch the first model with another model

820

provide the handover command for the user equipment

900 receive, from a source base station, a handover configuration with respect to at least one target base station, wherein the handover configuration is configured to cause the apparatus to perform data collection for a model compatibility evaluation procedure between a first model of the source base station and a second model of the at least one target base station — 910

obtain data based, at least partially, on the handover configuration — 920

transmit, to the source base station, the obtained data — 930

determine that a handover condition of the handover configuration is met — 940

perform handover from the source base station to the at least one target base station — 950

FIG. 9

1000 determine whether at least one function enabled with a first model is compatible with a second model with respect to a handover procedure 1010

cause at least one of:

data collection, update of the first model, or switch of the first model with another model based, at least partially, on the determination of whether the at least one function is compatible with a second model 1020

provide the user equipment with a handover configuration, wherein the handover configuration is configured to cause the user equipment to perform data collection 1030

receive data collected with the user equipment 1040

cause update of the first model 1050

FIG. 10

AI/ML MODEL FUNCTIONALITY IN HANDOVER SCENARIOS

RELATED APPLICATION

This application claims priority from U.S. Provisional Application No. 63/426,104, filed on Nov. 17, 2022, and entitled "AI/ML MODEL FUNCTIONALITY IN HANDOVER SCENARIOS" which is incorporated herein by reference in its entirety.

TECHNICAL FIELD

The example and non-limiting embodiments relate generally to AI/ML model functionality and, more particularly, to evaluation of whether AI/ML model functionality may be maintained, adapted, or survive after handover.

BACKGROUND

It is known, in cellular communication, to perform handover based on fulfillment of a handover condition.

SUMMARY

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: initiate performance of at least one function enabled with a first model; receive, from a source base station, at least one model compatibility configuration; determine whether the at least one function is compatible with a second model of at least one target base station based, at least partially, on the at least one model compatibility configuration; transmit, to the at least one target base station, at least one report, wherein the at least one report comprises, at least, an indication of a result of whether the at least one function is compatible with the second model of the at least one target base station; and receive, in response to the report, a conditional handover configuration, wherein the conditional handover configuration comprises, at least, an indication to at least one of: perform data collection, update the first model, or switch the first model with another model.

In accordance with one aspect, a method comprising: initiating, with a user equipment, performance of at least one function enabled with a first model; receiving, from a source base station, at least one model compatibility configuration; determining whether the at least one function is compatible with a second model of at least one target base station based, at least partially, on the at least one model compatibility configuration; transmitting, to the at least one target base station, a report, wherein the report comprises, at least, an indication of a result of whether the at least one function is compatible with the second model of the at least one target base station; and receiving, in response to the report, a conditional handover configuration, wherein the conditional handover configuration comprises, at least, an indication to at least one of: perform data collection, update the first model, or switch the first model with another model.

In accordance with one aspect, an apparatus comprising means for performing: initiating performance of at least one function enabled with a first model; receiving, from a source base station, at least one model compatibility configuration; determining whether the at least one function is compatible with a second model of at least one target base station based, at least partially, on the at least one model compatibility configuration; transmitting, to the at least one target base station, a report, wherein the report comprises, at least, an indication of a result of whether the at least one function is compatible with the second model of the at least one target base station; and receiving, in response to the report, a conditional handover configuration, wherein the conditional handover configuration comprises, at least, an indication to at least one of: perform data collection, update the first model, or switch the first model with another model.

In accordance with one aspect, a non-transitory computer-readable medium comprising program instructions stored thereon for performing at least the following: initiating performance of at least one function enabled with a first model; causing receiving, from a source base station, of at least one model compatibility configuration; determining whether the at least one function is compatible with a second model of at least one target base station based, at least partially, on the at least one model compatibility configuration; causing transmitting, to the at least one target base station, of a report, wherein the report comprises, at least, an indication of a result of whether the at least one function is compatible with the second model of the at least one target base station; and causing receiving, in response to the report, of a conditional handover configuration, wherein the conditional handover configuration comprises, at least, an indication to at least one of: perform data collection, update the first model, or switch the first model with another model.

In accordance with one aspect, an apparatus comprising: at least one processor; and at least one memory storing instructions that, when executed by the at least one processor, cause the apparatus at least to: receive, from a source base station, a handover request with respect to a user equipment, in a cell of the source base station, that is performing at least one function enabled with a first model, wherein the handover request comprises at least one report, wherein the at least one report comprises, at least, an indication of whether the at least one function is compatible with a second model of the apparatus; determine a handover configuration for the user equipment, wherein the handover configuration comprises, at least, an indication to at least one of: perform data collection, update the first model, or switch the first model with another model; and provide the handover command for the user equipment.

In accordance with one aspect, a method comprising: receiving, with a target base station from a source base station, a handover request with respect to a user equipment, in a cell of the source base station, that is performing at least one function enabled with a first model, wherein the handover request comprises at least one report, wherein the at least one report comprises, at least, an indication of whether the at least one function is compatible with a second model of the target base station; determining a handover configuration for the user equipment, wherein the handover configuration comprises, at least, an indication to at least one of: perform data collection, update the first model, or switch the first model with another model; and providing the handover command for the user equipment.

In accordance with one aspect, an apparatus comprising means for performing: receiving, from a source base station, a handover request with respect to a user equipment, in a cell of the source base station, that is performing at least one function enabled with a first model, wherein the handover request comprises at least one report, wherein the at least one report comprises, at least, an indication of whether the at least one function is compatible with a second model of the apparatus; determining a handover configuration for the user equipment, wherein the handover configuration comprises, at least, an indication to at least one of: perform data collection, update the first model, or switch the first model with another model; and providing the handover command for the user equipment.

In accordance with one aspect, a non-transitory computer-readable medium comprising program instructions stored thereon for performing at least the following: causing receiving, with a target base station from a source base station, of a handover request with respect to a user equipment, in a cell of the source base station, that is performing at least one function enabled with a first model, wherein the handover request comprises at least one report, wherein the at least one report comprises, at least, an indication of whether the at least one function is compatible with a second model of the target base station; determining a handover configuration for the user equipment, wherein the handover configuration comprises, at least, an indication to at least one of: perform data collection, update the first model, or switch the first model with another model; and causing providing of the handover command for the user equipment.

In accordance with one aspect, an apparatus comprising: at least one processor; and at least one memory storing instructions that, when executed by the at least one processor, cause the apparatus at least to: receive, from a source base station, a handover configuration with respect to at least one target base station, wherein the handover configuration is configured to cause the apparatus to perform data collection for a model compatibility evaluation procedure between a first model of the source base station and a second model of the at least one target base station; obtain data based, at least partially, on the handover configuration; transmit, to the source base station, the obtained data; determine that a handover condition of the handover configuration is met; and perform handover from the source base station to the at least one target base station.

In accordance with one aspect, a method comprising: receiving, with a user equipment from a source base station, a handover configuration with respect to at least one target base station, wherein the handover configuration is configured to cause the user equipment to perform data collection for a model compatibility evaluation procedure between a first model of the source base station and a second model of the at least one target base station; obtaining data based, at least partially, on the handover configuration; transmitting, to the source base station, the obtained data; determining that a handover condition of the handover configuration is met; and performing handover from the source base station to the at least one target base station.

In accordance with one aspect, an apparatus comprising means for performing: receiving, from a source base station, a handover configuration with respect to at least one target base station, wherein the handover configuration is configured to cause the apparatus to perform data collection for a model compatibility evaluation procedure between a first model of the source base station and a second model of the at least one target base station; obtaining data based, at least partially, on the handover configuration; transmitting, to the source base station, the obtained data; determining that a handover condition of the handover configuration is met; and performing handover from the source base station to the at least one target base station.

In accordance with one aspect, a non-transitory computer-readable medium comprising program instructions stored thereon for performing at least the following: causing receiving, with a user equipment from a source base station, of a handover configuration with respect to at least one target base station, wherein the handover configuration is configured to cause the user equipment to perform data collection for a model compatibility evaluation procedure between a first model of the source base station and a second model of the at least one target base station; causing obtaining of data based, at least partially, on the handover configuration; causing transmitting, to the source base station, of the obtained data; determining that a handover condition of the handover configuration is met; and performing handover from the source base station to the at least one target base station.

In accordance with one aspect, an apparatus comprising: at least one processor; and at least one memory storing instructions that, when executed by the at least one processor, cause the apparatus at least to: determine whether at least one function enabled with a first model is compatible with a second model with respect to a handover procedure; cause at least one of: data collection, update of the first model, or switch of the first model with another model based, at least partially, on the determination of whether the at least one function is compatible with a second model; provide the user equipment with a handover configuration, wherein the handover configuration is configured to cause the user equipment to perform data collection; receive data collected with the user equipment; and cause update of the first model.

In accordance with one aspect, a method comprising: determining, with a base station, whether at least one function enabled with a first model is compatible with a second model with respect to a handover procedure; causing at least one of: data collection, update of the first model, or switch of the first model with another model based, at least partially, on the determination of whether the at least one function is compatible with a second model; providing the user equipment with a handover configuration, wherein the handover configuration is configured to cause the user equipment to perform data collection; receiving data collected with the user equipment; and causing update of the first model.

In accordance with one aspect, an apparatus comprising means for performing: determining whether at least one function enabled with a first model is compatible with a second model with respect to a handover procedure; causing at least one of: data collection, update of the first model, or switch of the first model with another model based, at least partially, on the determination of whether the at least one function is compatible with a second model; providing the user equipment with a handover configuration, wherein the handover configuration is configured to cause the user equipment to perform data collection; receiving data collected with the user equipment; and causing update of the first model.

In accordance with one aspect, a non-transitory computer-readable medium comprising program instructions stored thereon for performing at least the following: determining whether at least one function enabled with a first model is compatible with a second model with respect to a handover procedure; causing at least one of: data collection, update of the first model, or switch of the first model with another model based, at least partially, on the determination of whether the at least one function is compatible with a second model; causing providing the user equipment with a handover configuration, wherein the handover configuration is configured to cause the user equipment to perform data collection; causing receiving of data collected with the user equipment; and causing update of the first model.

According to some aspects, there is provided the subject matter of the independent claims. Some further aspects are defined in the dependent claims.

BRIEF DESCRIPTION OF THE DRAWINGS

The foregoing aspects and other features are explained in the following description, taken in connection with the accompanying drawings, wherein:

FIG. 7 is a flowchart illustrating steps as described herein;

FIG. 8 is a flowchart illustrating steps as described herein;

FIG. 9 is a flowchart illustrating steps as described herein; and

FIG. 10 is a flowchart illustrating steps as described herein.

DETAILED DESCRIPTION OF EMBODIMENTS

Figure 1:
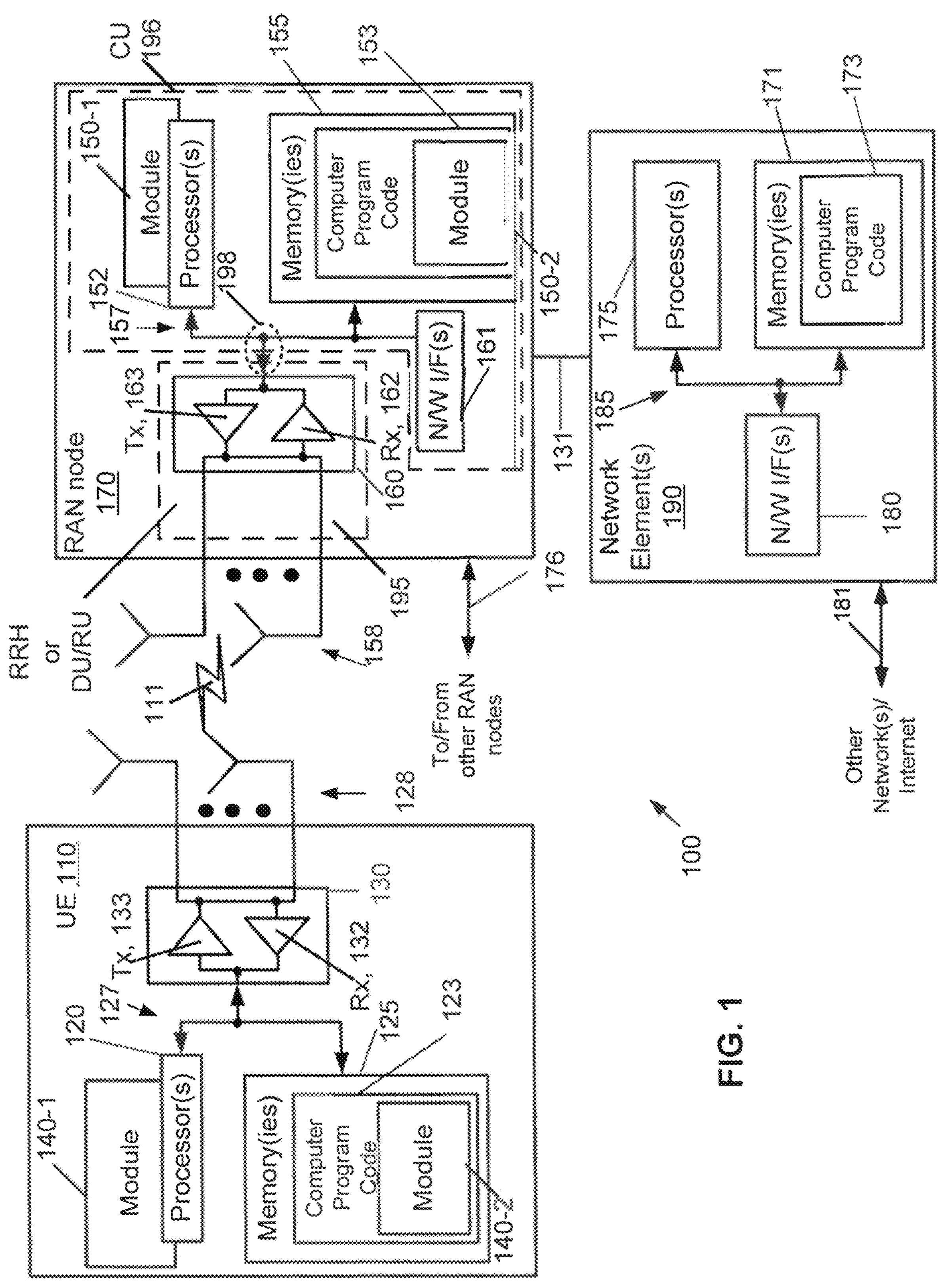
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
6G sixth generation
AI artificial intelligence
AMF access and mobility management function
BM beam management
CHO conditional handover
cRAN cloud radio access network
CSI-RS channel state information reference signal
CU central unit
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
HO handover
I/F interface
KPI key performance indicator
L1 layer 1
LTE long term evolution
MAC medium access control
ML machine learning
MME mobility management entity
ng or NG new generation
NGAP new generation application protocol
ng-eNB or NG-eNB new generation eNB
NR new radio
N/W or NW network
O-RAN open radio access network
PDCP packet data convergence protocol
PHY physical layer
PRACH physical random access channel
RACH random access channel
RAN radio access network
RF radio frequency
RLC radio link control
RRC radio resource control
RRH remote radio head
RS reference signal
RSRP reference signal received power
RU radio unit
Rx receiver
SDAP service data adaptation protocol
SGW or S-GW serving gateway
SMF session management function
SSB synchronization signal block
Tx transmitter
UE user equipment (e.g., a wireless, typically mobile device)
UPF user plane function
VNR virtualized network function Turning to FIG. 1, this figure shows a block diagram of one possible and non-limiting example in which the examples may be practiced. A user equipment (UE) 110, radio access network (RAN) node 170, and network element (s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR), and/or 5G-Advanced (i.e. NR Rel-18 and beyond) and/or 6G. In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element (s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit (s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station, access point, access node, or node.

The RAN node 170 includes one or more processors 152, one or more memories 155, one or more network interfaces (N/W I/F (s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor (s) 152, memories 155, and network interfaces 161. Note that the DU 195 may also contain its own memory/memories and processor (s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link (s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function (s) (AMF (s)) and/or user plane functions (UPF (s)) and/or session management function (s) (SMF (s)). Such core network functionality for LTE may include MME (Mobility Management Entity)/SGW (Serving Gateway) functionality. These are merely illustrative functions that may be supported by the network element (s) 190, and note that both 5G and LTE functions might be supported. The RAN node 170 is coupled via a link 131 to a network element 190. The link 131 may be implemented as, e.g., an NG interface for 5G, or an SI interface for LTE, or other suitable interface for other standards. The network element 190 includes one or more processors 175, one or more memories 171, and one or more network interfaces (N/W I/F (s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers.

For example, network core functions and/or radio access network (s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. cRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various example embodiments of the user equipment 110 can include, but are not limited to, cellular smart phones, tablets, personal digital telephones such as assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

Features as described herein generally relate to Artificial Intelligence (AI)/Machine Learning (ML) for NR Air Interface, for which there is a REL-18 Study Item (see, e.g., Artificial Intelligence (AI)/Machine Learning (ML) for NR Air Interface described in RP-213599 (https://www.3gpp.org/ftp/TSG_RAN/TSG_RAN/TSGR_94 e/Docs/RP-213599. zip)). The study item aims at exploring the benefits of augmenting the air interface with features enabling support of AI/ML-based algorithms for enhanced performance and/or reduced complexity/overhead. The study item's target is to lay the foundation for future air-interface use cases leveraging AI/ML techniques. The initial set of use cases to be covered include channel state information (CSI) feedback enhancement (e.g., compression of CSI reports, overhead reduction, improved accuracy, prediction), beam management (e.g., beam prediction in time, and/or spatial domain for overhead and latency reduction, beam selection accuracy improvement), and positioning accuracy enhancements. For those use cases, the benefits shall be evaluated (e.g. utilizing developed methodology and defined key performance indicators (KPI)) and potential impact on the specification (s) shall be assessed, including PHY layer aspects and protocol aspects.

Features as described herein may generally relate to the following potential outcome of the study item: "The AI/ML approaches for the selected sub use cases need to be diverse enough to support various requirements on the gNB-UE collaboration levels." A collaboration level may indicate whether either the gNB or the UE or both are "running" ML enabled functionality, and how and what information flows between the gNB and UE to allow "running" of such ML enabled functionality (e.g. life cycle management aspects such as data collection, model training, model inference, model monitoring functions, etc.).

It may be noted that other uses cases might be addressed in the work item phase of "AI/ML for air interface." Starting from Release 18, companies may propose a large variety of use cases and applications on ML in the gNB and UE. The goal of the work item is to explore the benefits of augmenting the air-interface with features enabling improved support of AI/ML-based algorithms for enhanced performance and/or reduced complexity/overhead. The enhanced performance may depend on the considered use cases and may be, for example, improved throughput, robustness, accuracy, and/or reliability, etc. The goal of the work item may be that sufficient use cases will be considered to enable the identification of a common AI/ML framework, including functional requirements of AI/ML architecture, which may be used in subsequent projects. The study may also identify areas where AI/ML may improve the performance of air-interface functions. Specification impact may be assessed in order to improve the overall understanding of what would be required to enable AI/ML techniques for the air interface.

Features as described herein may generally relate to one or more AI/ML models. For example, an AI/ML model (s) may be located with each of a UE and a base station (e.g. split between multiple nodes, or a separate model at each node). Alternatively, an AI/ML model may be located with one of a UE or a base station.

An example of an AI/ML model is a neural network. A neural network (NN) is a computation graph consisting of two or more layers of computation. Each layer may consist of one or more units, where each unit may perform an elementary computation. A unit may be connected to one or more other units, and the connection may have a weight associated with it. The weight may be used for scaling the signal passing through the associated connection. Weights may be learnable parameters, i.e., values which can be learned from training data. There may be other learnable parameters, such as those of batch-normalization layers.

Two of the most widely used architectures for neural networks are feed-forward and recurrent architectures. Feed-forward neural networks do not comprise a feedback loop; each layer takes input from one or more of the previous layers and provides output, which is used as the input for one or more of the subsequent layers. Units within a layer take input from unit (s) in one or more preceding layers, and provide output to unit (s) of one or more following layers.

Initial layers, i.e. layers close to the input data, extract semantically low-level features from received data, and intermediate and final layers extract more high-level features. After the feature extraction layers there may be one or more layers performing a certain task, such as classification, semantic segmentation, object detection, denoising, style transfer, super-resolution, etc. In recurrent neural networks, there is a feedback loop, so that the network becomes stateful, i.e., it is able to memorize or retain information or a state.

Neural networks may be utilized in an ever increasing number of applications for many different types of device, such as mobile phones, as described above. Examples of applications may include image and video analysis and processing, social media data analysis, device usage data analysis, etc.

Neural networks, and other machine learning tools, may be able to learn properties from input data, either in a supervised way or in an unsupervised way. Such learning may be the result of a training algorithm, or of a meta-level neural network providing a training signal.

A training algorithm may consist of changing some properties of the neural network so that the output of the neural network is as close as possible to a desired output. Training may comprise changing properties of the neural network so as to minimize or decrease the output's error, also referred to as the loss. Examples of losses include mean squared error (MSE), cross-entropy, etc. In recent deep learning techniques, training is an iterative process, where, at each iteration, the algorithm modifies the weights of the neural network to make a gradual improvement of the network's output, i.e., to gradually decrease the loss.

Training a neural network comprises an optimization process, but the final goal of machine learning is different from the typical goal of optimization. In optimization, the goal is to minimize loss. In machine learning generally, in addition to the goal of optimization, the goal is to make the model learn the properties of the data distribution from a limited training dataset. In other words, the training process is additionally used to ensure that the neural network learns to use a limited training dataset in order to learn to generalize to previously unseen data, i.e., data which was not used for training the model. This additional goal is usually referred to as generalization. In practice, data may be split into at least two sets, the training set and the validation set. The training set may be used for training the network, i.e., for modification of its learnable parameters in order to minimize the loss. The validation set may be used for checking the performance of the neural network with data which was not used to minimize the loss (i.e. which was not part of the training set), where the performance of the neural network with the validation set may be an indication of the final performance of the model. The errors on the training set and on the validation set may be monitored during the training process to understand if the neural network is learning at all and if the neural network is learning to generalize. In the case that the network is learning at all, the training set error should decrease. If the network is not learning, the model may be in the regime of underfitting. In the case that the network is learning to generalize, validation set error should decrease and not be much higher than the training set error. If the training set error is low, but the validation set error is much higher than the training set error, or the validation set error does not decrease, or it even increases, the model may be in the regime of overfitting. Overfitting may mean that the model has memorized the training set's properties and performs well only on that set, but performs poorly on a set not used for tuning its parameters. In other words, the model has not learned to generalize.

In the present description, the terms "model", "AI model", and "ML model" may be interchanged with each other; where an example embodiment is described with reference to one type of model, another type of model may be substituted. In the present description, the terms "ML-enabled function", "ML functionality", "AI-enabled function", "AI functionality", "AI/ML-enabled function", and "AI/ML functionality" may be interchanged with each other as well.

Figure 2:
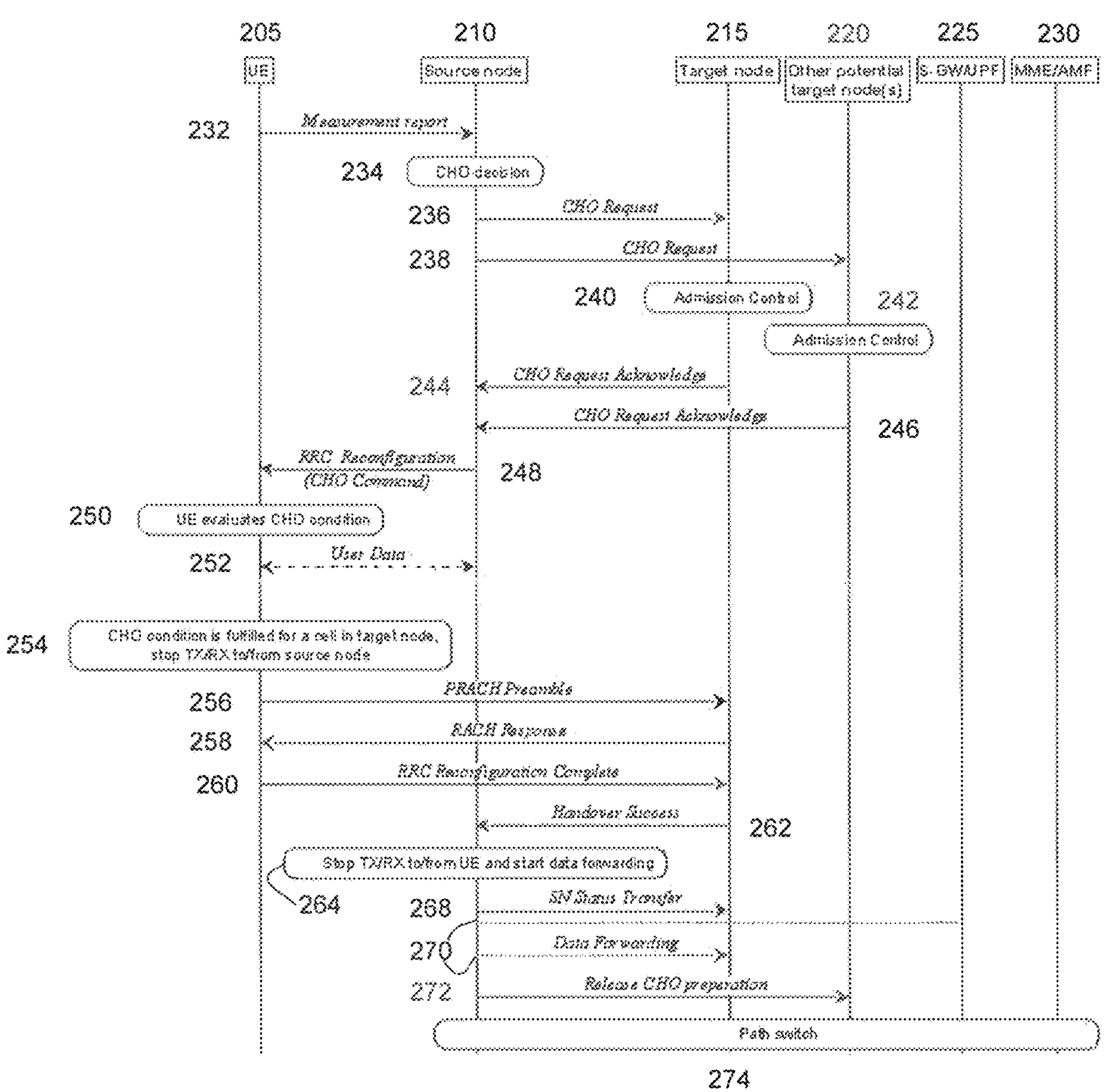
FIG. 2 is a flowchart illustrating steps as described herein.

Features as described herein may generally relate to conditional handover (CHO), which is a well-known procedure defined during 3GPP Rel-16 for improving mobility performance of the UE by reducing the number of mobility failures. Referring now to FIG. 2, illustrated is an example message sequence chart for conditional handover. Portions of FIG. 2 may be similar to handover as described in NR Rel. 15 [TS 38.300].

A configured event may trigger the UE (205) to send a measurement report (232) to a source node (210). Based on this report, the source node (210) may prepare one or more target cells for the handover. The source node (210) may transmit a CHO request (236) to a target node (215), and, optionally, a CHO request (238) to other potential target node (s) (220). The target node (215) may perform admission control (240). Optionally, the other potential target node(s) (220) may perform admission control (242). Th target node (215) may transmit, to the source node (210), a CHO request acknowledge message (244). Optionally, the other potential target node (s) (220) may transmit, to the source node (210) a CHO request acknowledge message (246). The source node (210) may then send an RRC Reconfiguration (CHO command) (248) to the UE (205).

For baseline handover of NR Rel. 15, the UE may immediately access the target cell to complete the handover. Instead, for CHO, the UE (205) may only access the target cell (215) once an additional CHO execution condition expires (i.e. the HO preparation and execution phases are decoupled). The condition may be configured by the source node in HO Command. Accordingly, the UE (205) may evaluate one or more CHO condition (s) (250). Optionally, the UE (205) and the source node (210) may exchange user data (252). At 254, once the CHO condition is fulfilled for a cell in the target node (215), the UE (205) may stop TX/RX to/from the source node (210), and begin handover (HO). At 256, the UE (205) may transmit, to the target node (215) a PRACH preamble. At 258, the target node (215) may transmit, to the UE (205), a RACH response. At 260, the UE (205) may transmit, to the target node (215), an RRC Reconfiguration Complete message.

Once the UE (205) completes the handover execution to the target cell (215) (e.g. UE has sent RRC Reconfiguration Complete (260)), the target cell (215) may send, to the source cell (210), a "Handover Success" indication (262). When receiving this indication from target cell, at 264 the source cell (210) may stop its TX/RX to/from UE and starts data forwarding to the target cell (215) (e.g. SN status transfer (268) to target node (215), data forwarding (270) to target node (215) and S-GW/UPF (225)). Moreover, at 272 the source (210) may release the CHO preparations in other target nodes/cells (e.g. 220) (which are no longer needed) when it receives "HO Success" indication. At 274, path switch may be performed between the source node (210), target node (215), S-GW/UPF (225), and MME/AMF (230).

An advantage of the CHO is that the HO command may be sent very early, when the UE is still safe in the source cell, without risking the access in the target cell and the stability of its radio link. That is, conditional handover may provide mobility robustness and protection against mobility failure.

Figure 3:
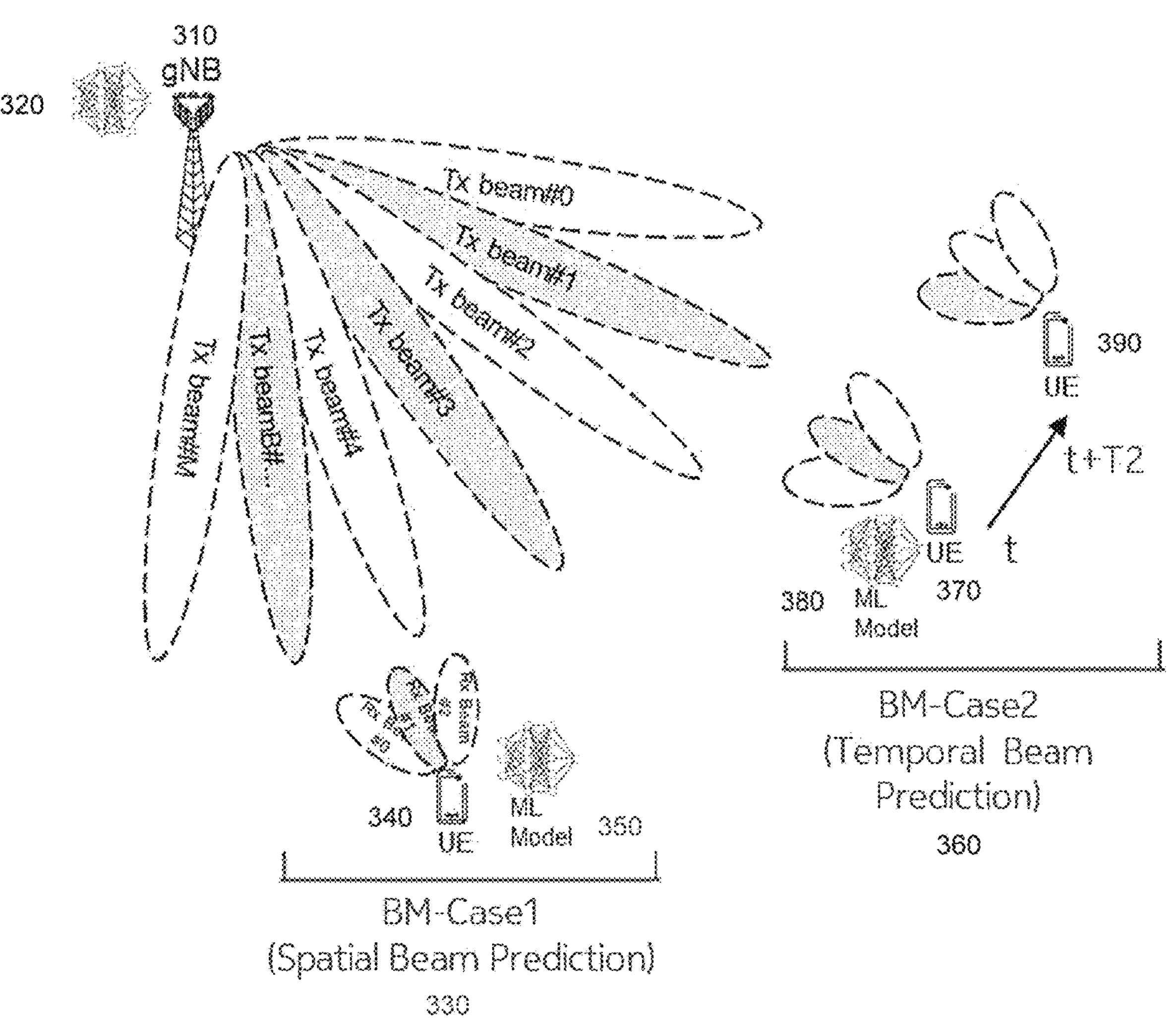
FIG. 3 is a diagram illustrating features as described herein.

Features as described herein may generally relate to Rel-18 AI/ML beam management. Referring now to FIG. 3, illustrated are nonlimiting example beam management (BM) use cases for AI/ML. In the example, a gNB (310) may be configured with a ML model (320). The gNB (310) may transmit multiple different TX beams. In a first BM use case (330), spatial beam prediction may be performed by a UE (340) configured with a ML model (350) by predicting Tx beam #1 or Tx beam #3 given Tx beam #0, Tx beam #2 and Tx beam #4 for example. In a second BM use case (360), temporal beam prediction may be performed with a UE (370) configured with a ML model (380), which may be at a first location (370) at time t and at a second location (390) at time t+T2 by predicting a best beam which may serve the UE at further instants of time or further instants of time in a future time window.

Legacy beam management procedures (P1, P2, P3) require the time-consuming operation of sweeping all the Tx and Rx beams by configuring the UE with a large number of SSB/CSI-RSs measurements. The Rel-18 study item description relates to AI/ML-assisted beam management for overhead savings and latency reduction. Key sub-use cases for further study include BM-Case1 (Spatial Beam Prediction) (330) and BM-Case2 (Time Beam Prediction) (360). For each sub-use case, the optimization targets include: DL Tx beam prediction (P1/P2 joint optimization); and DL Tx-Rx beam pair prediction (P1/P2/P3 joint optimization). With respect to this study item description, performance targets and KPIs include: beam prediction accuracy related KPIs (e.g. prediction accuracy, RSRP difference); and system performance related KPIs (e.g. UE throughput, control signal overhead, and power consumption).

Figure 4:
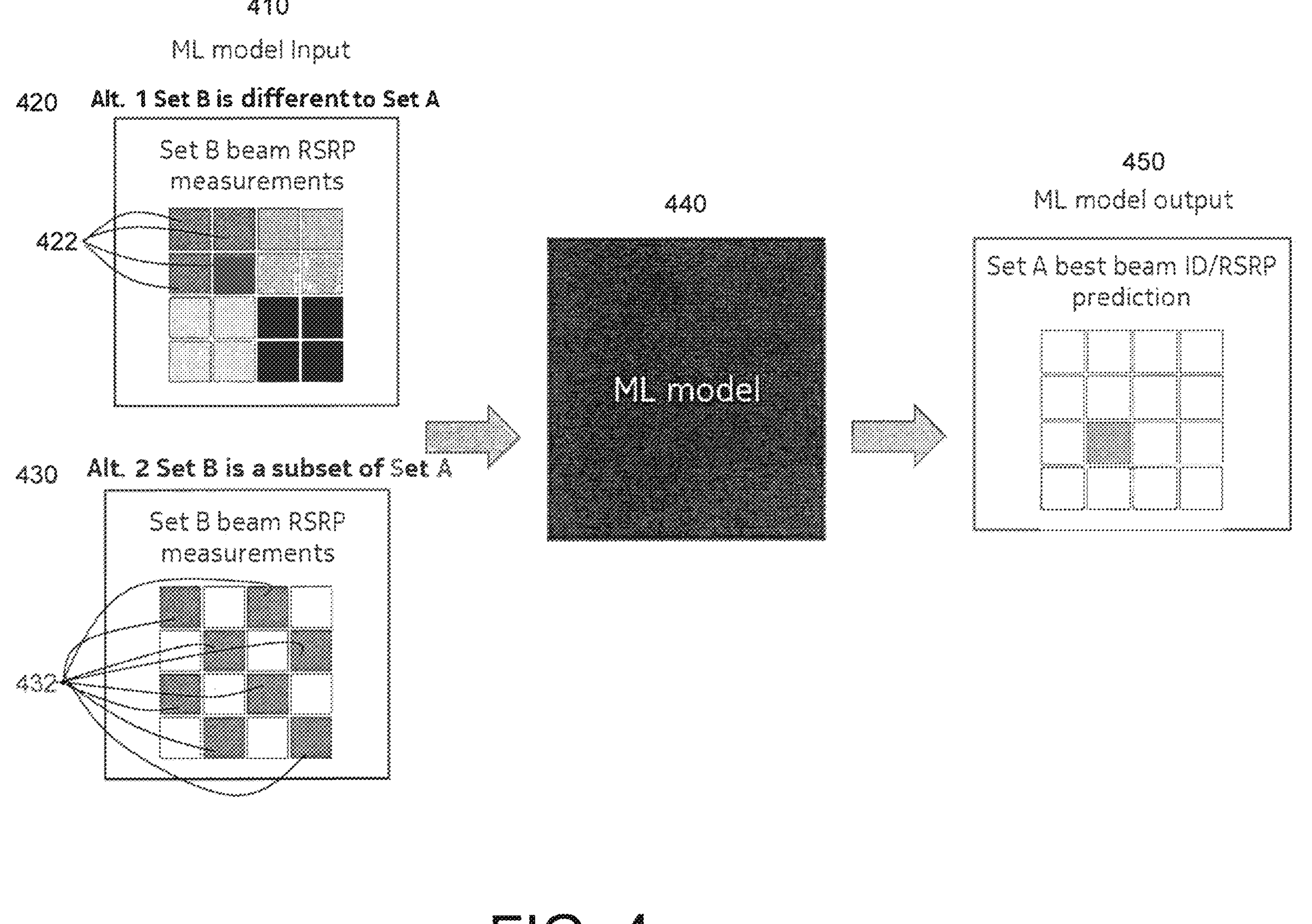
FIG. 4 is a diagram illustrating features as described herein.

Referring now to FIG. 4, illustrated are configurations for BM-Case 1 (i.e. spatial beam prediction). Different ML model input (410) is possible for an ML model (440). In a first alternative (420) (Alt-1), set B may be different from set A. In other words, various different beam RSRP measurements may be input. Illustrated are bitmap positions on a grid for corresponding reference signals (e.g. 422). In a second alternative (430) (Alt-2), set B may be a subset of set A. The output (450) of the ML model (440) may be that set A is the best beam ID/RSRP prediction. Illustrated are bitmap positions on a grid for corresponding reference signals (e.g. 432, white boxes).

One non-limiting example of Alt-1 may allow the UE to perform a prediction of a narrow beam in Set A based on a wide beam in Set B. The same example may allow an extension with even different reference signals used, for example Set B may use SSB based beams, whereas Set A may predict CSI-RS based beams). Another non-limiting example of Alt-2 may allow predicting the Set A from Set B based on same type of reference signal (i.e., wide beam to wide beam or narrow to narrow, hence the term subset).

3GPP has discussed the following configurations for BM-Case 1 (i.e., spatial beam prediction). For the AI/ML input (410), L1-RSRP measurements may be of a subset of narrow beams, and/or of wide beams. For the AI/ML Input (410), assistance info (i.e. beam shape information, beam ID) may be input. For the AI/ML output (450), the best narrow beam ID or best narrow beam RSRP, or (internal) Qos value for beam selection may be output. An (offline) 5G system level simulator may provide model training data to the ML model (440).

It may be noted that the ML model (440) may be a UE-side ML model, network-side ML model, a one-sided ML model, or a two-sided ML model. In other words, the inference of the ML model may be performed entirely at the UE side, entirely at the network side, or partially at the UE side and partially at the network side, where ML models at each side are paired together to produce a joint inference.

While FIGS. 3-4 relate to use of AI/ML models for beam management, these examples are not limiting; AI/ML models may be used for other purposes, including but not limited to CSI feedback enhancement and positioning accuracy. Other uses of AI/ML models may be substituted where appropriate with regard to example embodiments of the present disclosure.

TABLE 1 is a (working) list of terminologies for use for RAN1 AI/ML air interface study item discussion. The description of the terminologies may be further refined as the study progresses. New terminologies may be added as the study progresses.

TABLE 1

| Terminology | Description |
|---|---|
| Data collection | A process of collecting data by the network nodes, management entity, or UE for the purpose of AI/ML model training, data analytics and inference |
| AI/ML Model | A data driven algorithm that applies AI/ML techniques to generate a set of outputs based on a set of inputs. |
| AI/ML model training | A process to train an AI/ML Model [by learning the input/output relationship] in a data driven manner and obtain the trained AI/ML Model for inference |
| AI/ML model Inference | A process of using a trained AI/ML model to produce a set of outputs based on a set of inputs |
| AI/ML model validation | A subprocess of training, to evaluate the quality of an AI/ML model using a dataset different from one used for model training, that helps selecting model parameters that generalize beyond the dataset used for model training. |
| AI/ML model testing | A subprocess of training, to evaluate the performance of a final AI/ML model using a dataset different from one used for model training and validation. Differently from AI/ML model validation, testing does not assume subsequent tuning of the model. |
| UE-side (AI/ML) model | An AI/ML Model whose inference is performed entirely at the UE |
| Network-side (AI/ML) model | An AI/ML Model whose inference is performed entirely at the network |
| One-sided (AI/ML) model | A UE-side (AI/ML) model or a Network-side (AI/ML) model |
| Two-sided (AI/ML) model | A paired AI/ML Model(s) over which joint inference is performed, where joint inference comprises AI/ML Inference whose inference is performed jointly across the UE and the network, i.e, the first part of inference is firstly performed by UE and then the remaining part is performed by gNB, or vice versa. |

TABLE 1-continued

| Terminology | Description |
|---|---|
| AI/ML model transfer | Delivery of an AI/ML model over the air interface, either parameters of a model structure known at the receiving end or a new model with parameters. Delivery may contain a full model or a partial model. |
| Model download | Model transfer from the network to UE |
| Model upload | Model transfer from UE to the network |
| Federated learning/ federated training | A machine learning technique that trains an AI/ML model across multiple decentralized edge nodes (e.g., UEs, gNBs) each performing local model training using local data samples. The technique requires multiple interactions of the model, but no exchange of local data samples. |
| Offline field data | The data collected from field and used for offline training of the AI/ML model |
| Online field data | The data collected from field and used for online training of the AI/ML model |
| Model monitoring | A procedure that monitors the inference performance of the AI/ML model |
| Supervised learning | A process of training a model from input and its corresponding labels. |
| Unsupervised learning | A process of training a model without labelled data. |
| Semi-supervised learning | A process of training a model with a mix of labelled data and unlabelled data |
| Reinforcement Learning (RL) | A process of training an AI/ML model from input (a.k.a. state) and a feedback signal (a.k.a. reward) resulting from the model's output (a.k.a. action) in an environment the model is interacting with. |
| Model activation | enable an AI/ML model for a specific function |
| Model deactivation | disable an AI/ML model for a specific function |
| Model switching | Deactivating a currently active AI/ML model and activating a different AI/ML model for a specific function |

Terms used in the present disclosure may be defined as in TABLE 1.

The following was agreed in RAN1 #110bis-e:

" . . . Study various approaches for achieving good performance across different scenarios/configurations/sites, including

- Model generalization, i.e., using one model that is generalizable different to scenarios/configurations/sites
- Model switching, i.e., switching among a group of models where each model is for a particular scenario/configuration/site
  - [Models in a group of models may have varying model structures, share a common model structure, or partially share a common sub-structure. Models in a group of models may have different input/output format and/or different pre-/post-processing.]
- Model update, i.e., using one model whose parameters are flexibly updated as the scenario/configuration/site that the device experiences changes over time. Fine-tuning is one example . . . "

During the meeting with respect to the above agreement, three different approaches for achieving good performance for the ML-enabled function were discussed. In the first approach, model generalization, it is suggested that a common model be used to cover a wide variety of scenarios, and to train a model with this assumption suitably. However, the main issue is that, in many cases, a generalized ML model may not be found, or may even be impossible to achieve, as the number of cell-specific configurations of parameters (antenna panel configuration, reference signal types and their transmission configurations, etc.) may be too large, and training for such a model may be impossible. Hence, a different approach may be needed, such as a hybrid solution that may allow runtime checking for possible model generalization, and may enable further determining of whether there is a ML model update required, or whether a ML model switch is needed.

Based on the above discussion, from the UE perspective, during the HO procedure, a UE-side (AI/ML) model or two-sided (AI/ML) model may face different issues. Issue 1: mismatch in ML functionality between the source and target cell (s)—for example, there may be functionality differences between the source and target cell ML models that may need to be resolved. Issue 2: aspect of generalization of ML functionality between the source and target cell (s)—for example how to harmonize the differences between the source and target cell ML models, which may need to be resolved. Issue 3: seamless ML model operation during handover—for example defining the (necessary) signaling procedures.

From the network perspective, during the HO procedure, a network-side (AI/ML) model or two-sided (AI/ML) model may face the exact same issues as a UE-side (AI/ML) model, except that it may not involve the UE (i.e. may not require any signaling towards the UE, but may be handled within the network using procedures between gNB (s)).

Example embodiments of the present disclosure may address some of the above issues.

In an example embodiment, it may be determined how an ML enabled function may undergo adaptation when a UE moves from the source cell to the target cell before, during, and after HO. In other words, it may be determined how the ML enabled function "survives" through the handover, and what changes inside it during the HO process.

In the present disclosure, the term "mismatch" may be used to indicate that there is a difference in ML functionality available for a given task (s) before and after handover. For example, if an ML model function partially or fully present in a source cell is different from the ML model function partially or fully present in a target cell, to enable continuous ML model processing, the ML model of the target cell may be kept, switched, and/or updated. In the present disclosure, the term "compatible" or "compatibility" may be regarded as the opposite of "mismatch". For example, if there is a mismatch between ML functionalities, the ML functionalities are not compatible. For example, if ML functionalities are compatible, there is not a mismatch between the ML functionalities. The mismatch between ML functionality of two entities may be determined, assessed, evaluated, reported, handled, etc. in example embodiments of the present disclosure.

In an example embodiment, there may be a signaling procedure between a UE and a network to determine mismatch between source and target cell (s) ML functionality for a given use case.

In a first scenario, the UE may be involved in a procedure for evaluating mismatch in ML functionality, as it may receive one or more configuration and control messages and provide one or more response messages in return to the network. For example, for a UE sided ML model or a two sided ML model, the network may be expected to provide a configuration to the UE, and the UE may perform a few steps to make the assessment whether a ML enabled function (e.g. beam management in time or spatial domain) can continue after a handover. Additionally or alternatively, the UE may determine how the handover process impacts the ML enabled function.

In the first scenario, the procedure for determining mismatch between source cell ML functionality and target cell ML functionality may be controlled by the network using a specific configuration provided to the UE in a control plane signaling message (e.g. RRC) to allow/enable the UE to determine if the ML model operating in the source cell may be used in the target cell as well (i.e. after handover).

Figure 5:
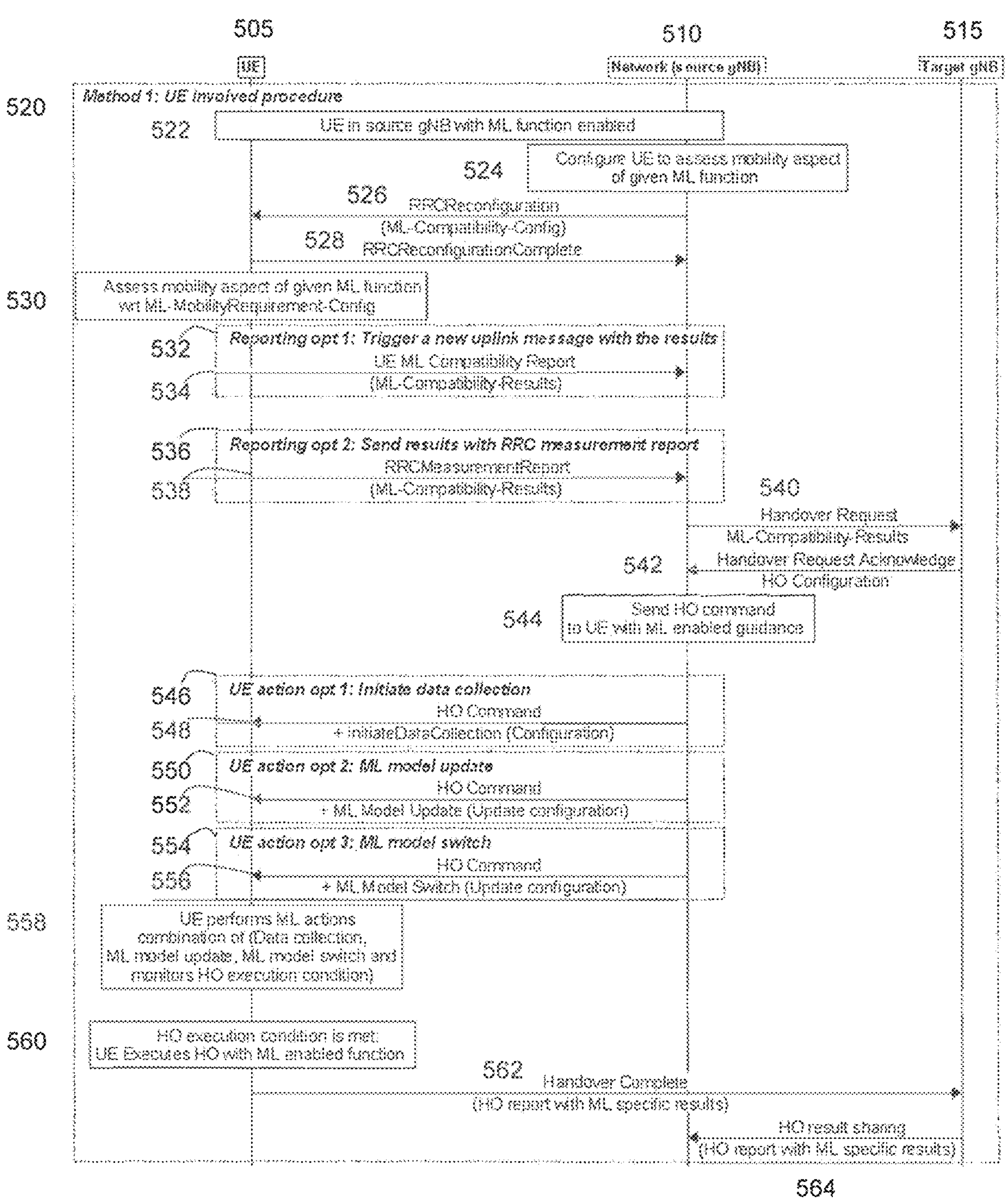
FIG. 5 is a flowchart illustrating steps as described herein.

Referring now to FIG. 5, illustrated is an example message sequence for the first scenario (520). At 522, the UE (505) may be assumed to be running the ML enabled function in the source cell or source serving cells (510) (e.g. in case multiple cells are configured in carrier aggregation). At 524, the network (510) may prepare the configuration for a given UE (e.g. 505) to make an assessment of how an ML enabled function will continue before, during and after the HO procedure. This may be understood as an assessment of the mismatch of the ML enabled function in the source cell (s) v/s the target cell (s).

In an example embodiment, with an example of beam prediction in the spatial domain, the network (510) may request the UE to start measuring the beams corresponding to a set of target cell(s), and may also indicate if the beams measured correspond to Set A (e.g. consideration for model output or the prediction set that may be used for the model inference), and/or Set B (e.g. input of the model or the measurements that may be used for the model inference). The configuration may be provided for each target cell. In the example of FIG. 5, it may be assumed that there is only one target cell, but this is not limiting; there may be any number of target cells.

In an example embodiment, the configuration of Set B may comprise one or more of the following information elements: (subset) number of RS to measure (e.g. 8); bitmap positions on the grid for those corresponding reference signals (see, e.g., 422, 432); and/or the RS type to measure (SSB or CSI-RS). In an example embodiment, the configuration of Set A may comprise one or more of the following information elements: number of RS to predict (e.g. 32); bitmap positions on the grid for those corresponding reference signals (see, e.g., the white boxes in FIG. 4); and/or the RS type to measure (SSB or CSI-RS).

At 526, the network/source gNB (510) may transmit, to the UE (505), the prepared/determined configuration. For example, the configuration may be transmitted as ML-Compatibility-Config transmitted with an RRCReconfiguration message.

In an example embodiment, the configuration provided to the UE (505) may also indicate/provide guidance on how to perform any updates for model functionality for the target cell (i.e. if an update is required for model functionality). If multiple configurations are provided, each may be tagged with a usability measure, or score, constructed by the network (510) based on the previous usability reports made by previously configured UEs in the target cell (515) with the provided configuration. Such usability measure(s) may allow the UE (505) to prioritize the evaluation of different configurations, for example the highest usability ranking may be tested first, followed by the second highest usability ranking, and so on.

In an example embodiment, assuming beam prediction in the spatial domain (see FIGS. 3-4) at the UE side, the source cell beam prediction functionality may be different from the target cell beam prediction functionality, and the mismatch may be determined by the UE (505) based on the configuration provided to the UE (526).

While example embodiments of the present disclosure may be described with reference to beam prediction/management in the spatial domain, other ML model uses are possible; example embodiments of the present disclosure are not limited to the case of spatial beam prediction/beam management use cases.

At 528, the UE (505) may send, to the network (510), an acknowledgement for reception of the configuration message. For example, the acknowledgement may comprise, or be transmitted via, an RRCReconfigurationComplete message.

At 530, the UE (505) may use the configuration for the given target cell (515) to perform assessment of mismatch of the ML enabled function. In other words, the UE (505) may assess a mobility aspect of a given ML function with respect to ML-MobilityRequirement-Config. Assuming the same example as before (beam prediction in the spatial domain), as the target cell measurements may correspond to target cell Set A, the UE (505) may evaluate the performance of model functionality by comparing the measurements/outcomes corresponding to the ground-truth measurement/outcome of the target cell Set A (e.g. using the spatial Rx chain), and the predicted measurement/outcome of the target cell Set A (e.g. using the same ML model functionality as the source cell (510)).

In an example embodiment, when Set B is a sub-set of Set A (e.g. 430), the UE (505) may evaluate model accuracy-related KPIs considering target cell Set B and Set A, and may use result (s) of the evaluation to determine whether a model update is needed or not. An error metric may be computed between these measurements/outcomes (e.g. RSRP error difference or beam ID distance comparison) to determine the deviation between the performance of the ML models.

In an example embodiment, the UE (505) may evaluate the data drift among source cell Set A and target cell Set A, and may determine whether a model update is needed or not. Data drifting may be analyzed by comparing the data corresponding to the target cell Set A beam measurements (beam IDs and corresponding L1-RSRPs), and the data corresponding to Set A in the training dataset (used for model training), where statistical methods that analyze the correlation (e.g. Pearson's correlation) between data may be used.

In an example embodiment, the UE (505) may be triggered, by the provided configuration (526), to quantitatively evaluate if there is a mismatch. Additionally, the UE (505) may be enabled/allowed to determine additional steps to resolve the mismatch if found (e.g. to launch a data collection step, download a data patch from a data server to facilitate the ML model update, etc.). Assuming beam prediction in the spatial domain, the UE (505) may receive a configuration/indication to start measuring the target cell beams, where the configuration/indication may also indicate that the beams are corresponding to a Set A (e.g. consideration for model output or the prediction set that can be used for the model inference) and/or Set B (e.g. input of the model or the measurements that can be used for the model inference). The UE (505) may perform the beam measurements, and consider those measurements as a dataset; this may be referred to as a model validation/testing/monitoring dataset.

In an example embodiment, the UE (505) may be triggered, by the provided configuration (526), to determine if a model update is required or not, and what option (s) to use to execute a model update. For example, the UE (505) may determine to continue with the same model, make an incremental update to the existing model, or perform full model switching (i.e., for example switch out the current ML model and use another version that is compatible to the target cell). Assuming beam prediction in the spatial domain, when the target cell measurements are corresponding to target cell Set A, the UE may evaluate the performance of model functionality by using measurements corresponding to the target cell Set A. In an example embodiment, when Set B is a sub-set of Set A, the UE (505) may evaluate model accuracy-related KPIs considering target cell Set B and Set A, and may use results of the evaluation to determine whether a model update is needed or not. Additionally or alternatively, the UE (505) may evaluate the data drift among source cell Set A and target cell Set A, and determine whether a model update is needed or not.

In an example embodiment, the UE (505) may be triggered, by the provided configuration (526), to quantitively compute the parameters linked to the ML model update, for example time to perform a ML model update, margin of error based on a loss/gain function, etc. Assuming beam prediction in the spatial domain, the UE (505) may receive/use additional details/parameters related to model accuracy functions and/or acceptable accuracy thresholds to determine the model update. Additionally or alternatively, if the data drifting is considered, the UE may receive/use details on the allowed model input/output drifting-related thresholds to determine the model update.

In an example embodiment, the UE (505) may be triggered, by the provided configuration (526), to determine if the ML model update requires an interruption to the ongoing ML function, or if the update can happen independently.

After performing assessment/evaluation based on the received configuration, the UE (505) may report results to the network, such as the outcome of ML functionality evaluation. For example, the UE (505) may report the index of the configuration which passed a set of ML-requirements metrics. Additionally or alternatively, the UE (505) may report the best, second best (and so on) configuration indices which passed a set of ML-requirements metrics.

There may be at least two optional reporting options (532, 536). The UE (505) may provide the results on the ML enabled function to the network (510) by reporting the model accuracy KPI (e.g. RSRP error difference, error metric comparing the beam ID difference in the prediction, and/or a distance based error metric on how far the beam ID prediction is providing an indication of the inaccuracy) and/or data drift (e.g. Pearson's correlation) between the data samples. In the first option (532), a new uplink message with the results may be triggered. For example, at 534, a UE ML Compatibility report may be transmitted, which may include ML-Compatibility-Results. In the second option (536), results may be sent with an RRC measurement report. For example, at 538, an RRCMeasurementReport may be transmitted that includes ML-Compatibility-Results.

It may be noted that, at 526, multiple configurations may possibly be provided (e.g. by providing a list of configurations for the UE (505) to assess, either the same ML enabled function or different ML enabled functions). In the case of FIG. 5, the UE (505) may provide a separate report for each of the configurations at 532 or 536.

At 540, the source gNB (510) may share the ML compatibility results received from the UE (505) to the target gNB (515) (i.e. controlling the cells for which the UE (505) has performed the checks/evaluation/assessment indicated in earlier steps). For example, the network (510) may transmit, to the target gNB (515), a handover request including the ML-Compatibility-Results. The source gNB (510) may also further indicate, to the target gNB (515), additional information that may assist the target gNB to make the decision on the guidance for the ML enabled function.

In an example embodiment, the target gNB (515) may receive a guidance that the HO must be completed with priority and, hence, model update by data collection and retraining is not preferable. In another example embodiment, the target gNB (515) may be requested to provide a configuration to the UE (505) to start a new instance of ML enabled function in the target cell (515) for performing the model update. In another example embodiment, the target gNB (515) may be allowed to decide to determine that the HO must be completed with priority. Accordingly, the target gNB (515) may decide that model update by data collection and retraining is not preferable, and provide a configuration to the UE (505) to initiate a model switching to a new version of the ML enabled function.

In an example embodiment, the source gNB (510) may ask/request the target gNB (515) to make the final decision with respect to guidance for the ML enabled function, but send all the information about the decision (e.g. data collection period and number of samples, model training/update with labelled data provided by target gNB, and/or ML model ID in case model needs to be switched without update) and/or other information (e.g. worst case activation latency that ensures the UE (505) does not wait beyond a given time to perform the model update).

In an example embodiment, a combination of parameters may be given to the target gNB (515), for example a worst case activation latency, and a model ID for switching, in case the former cannot be met during update procedure.

In an example embodiment, guidance for data collection and labelling may also be provided to the target gNB (515), for example labelled data based on Set A in the target cell (510) may be provided that fixes the data drift.

At 542, the target gNB (515) may transmit, to the network (510) a handover request acknowledge message, which may include a HO configuration.

At 544, the network (510) may determine to send an HO command to the UE (505), where the HO command includes ML enabled guidance.

The network (510) may provide the HO configuration, as well as the options, to the UE, via one of at least three alternative options. Option 1 (546) is a data collection step;

the network (510) may transmit, to the UE (505), an HO command including an InitiateDataCollection configuration (548). Option 2 (550) is ML model update with data samples provided by network; the network (510) may transmit, to the UE (505), an HO command including an ML model update configuration (552). Option 3 (554) is ML model switching (ML model ID provided); the network (510) may transmit, to the UE (505), an HO command including an ML model switch update configuration (556).

At 558, the UE (505) may perform ML actions, which may be a combination of data collection, ML model update, and/or ML model switch. The UE (5050) may also perform monitoring of the HO execution condition.

For example, if the UE (505) receives an indication to perform a data collection step, as in Option 1 (546), it may initiate this step for the given set of target cells and label the data in accordance with the handover request (540) and the handover request acknowledgement (542). After the data collection is complete, the UE (505) may proceed to perform a ML model update.

For example, if the UE (505) is requested to create a new ML model for update (e.g. 550), it may copy the current ML model operating for the source cell (510) and perform the update on this copy. Once the update is completed, the UE (505) may switch to it based on the HO execution condition indicated in the HO command.

For example, the UE (505) may initiate a ML model switching to a new ML model given by a ML model ID in the HO configuration (i.e. in Option 3 (554)) directly if the network (510) requests it, or may wait until the maximum time elapses for model update, as provided in the worst case activation latency.

At 560, the UE (505) may determine that the HO execution condition is met. In response, the UE (505) may execute HO with ML enabled function. At this point, the UE (505) may be in a position to not only execute the HO based on the HO configuration, but also apply the ML enabled functionality based on the earlier steps and smoothly continue with ML operation in the target cell. At 562, the UE (505) may provide a feedback to the network (510) about the activities it performed (data collection, model update, activation time of ML model, error metrics after the ML model update, ML model switching time, etc.) to let the network know and note these for the future (i.e. to tune the future configuration (s)). This feedback may be provided as a HO report with ML specific results included with a handover complete message transmitted to the target gNB (515). At 564, the target gNB (515) may share HO results with the source gNB (510), for example by forwarding the HO report with ML specific results.

In a second scenario, the UE may not be directly involved in a procedure for evaluating mismatch in ML functionality, but may receive an updated radio reconfiguration message as outcome of the handover procedure. In the second scenario, the network (either the source or the target cell) may initiate the checking to determine if the ML model operating in the source cell may be used in the target cell as well (i.e. after handover), and, if an update is required, may determine how to perform such an update. Assuming beam prediction in the spatial domain at the UE side, the source cell beam prediction functionality may be different from the target cell beam prediction functionality, and this mismatch may be identifiable by the network.

Figure 6:
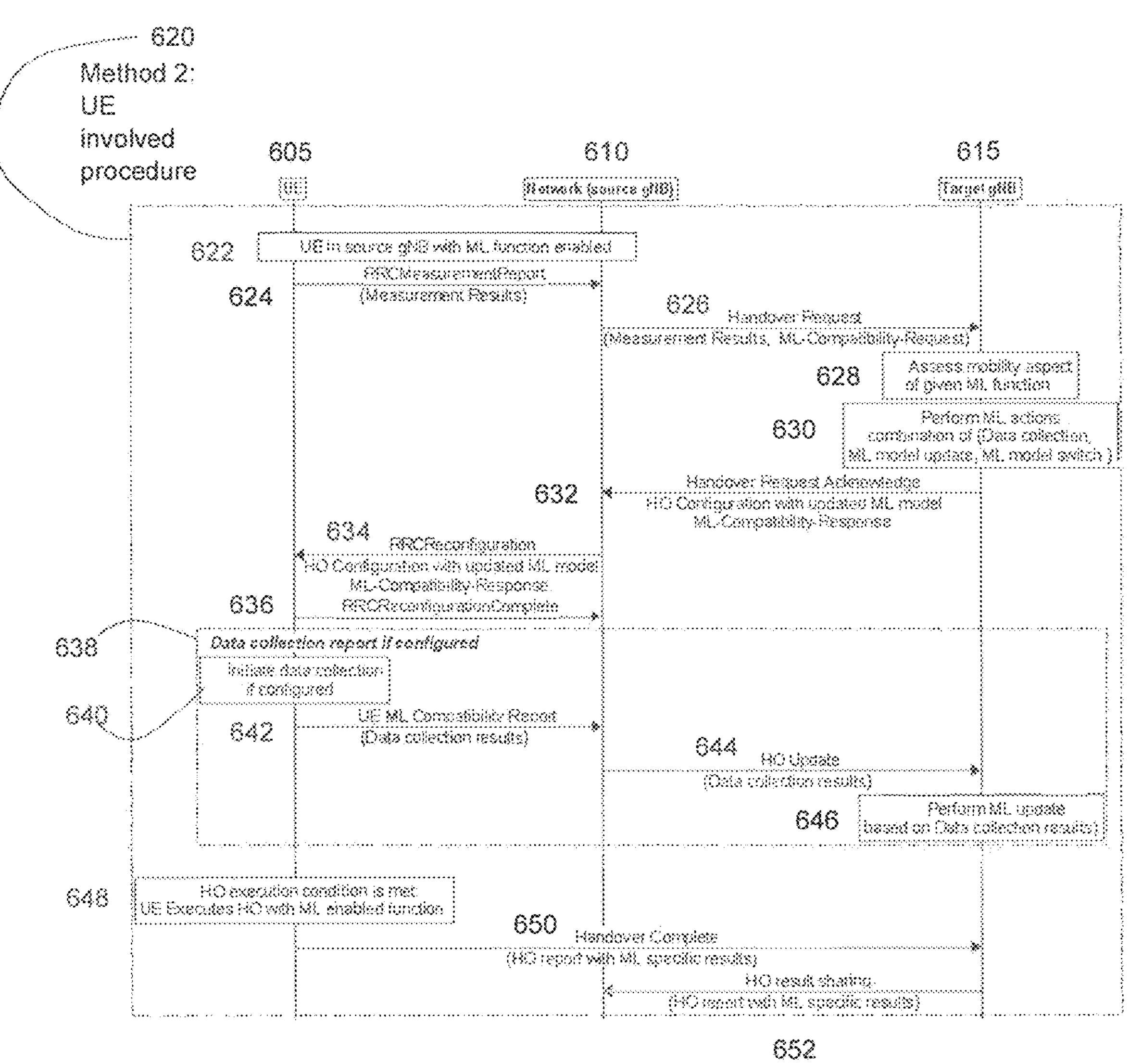
FIG. 6 is a flowchart illustrating steps as described herein.

Referring now to FIG. 6, illustrated is an example message sequence for the second scenario (620). The second scenario may be relevant to a purely network sided ML model, from the perspective that many of the steps which involve the UE (605) may also be performed by the network, either in the source (610) or target gNB (615). It may be noted that, in the second scenario (620), updating may be performed for the network side part of the ML enabled function (e.g. for a network side ML enabled function or a two-sided ML enabled model). Steps may be performed on the network side, with the UE (605) being involved only for data collection.

At 622, it may be assumed that the UE (605) is in the cell of the source gNB (610) with ML function enabled. At 624, the UE (605) may transmit, to the source gNB (610), an RRCMeasurementReport, which may include measurement results. At 626, the source gNB (610) may transmit, to the target gNB (615), a handover request, which may include the measurement results and/or a ML-Compatibility-Request. At 628, the target gNB (615) may assess a mobility aspect of a given ML function.

In an example embodiment, the procedure for evaluating ML functionality mismatch may trigger either the source gNB (610) or the target gNB (615) to provide, using either Xn or NGAP specific signaling, an indication to quantitatively evaluate if there is a mismatch, as well as to enable/allow it to determine additional steps to resolve the mismatch (e.g. to launch a data collection step, download a data patch from a data server, etc.).

In an example embodiment, the procedure for evaluating ML functionality mismatch may trigger either the source gNB (610) or the target gNB (615) to provide, using either Xn or NGAP specific signaling, an indication to determine if a model update is required or not, and what options to use to execute it if required. For example, the network may determine to continue with same model, make incremental update to existing model, or perform full model switching.

In an example embodiment, the procedure for evaluating ML functionality mismatch may trigger either the source gNB (610) or the target gNB (615) to provide, using either Xn or NGAP specific signaling, an indication to quantitively compute the parameters linked to the ML model update, for example time to perform a ML model update, margin of error based on a loss/gain function, etc.

In an example embodiment, the procedure for evaluating ML functionality mismatch may trigger either the source gNB (610) or the target gNB (615) to provide, using either Xn or NGAP specific signaling, an indication to determine if the ML model update requires an interruption to the ongoing ML function, or if the update may happen independently.

In an example embodiment, the procedure for evaluating ML functionality mismatch may trigger either the source gNB (610) or the target gNB (615) to provide, using either Xn or NGAP specific signaling, a reporting procedure to inform the peer node (s) of the outcome of the ML functionality mismatch evaluation, and generate the radio reconfiguration message for the UE (605).

At 630, the target gNB (615) may perform ML actions, which may be a combination of data collection, ML model update, and/or ML model switch (e.g. as described above with reference to 558). At 632, the target gNB (615) may transmit, to the source gNB (610) a handover request acknowledgement, which may include an HO configuration with updated ML model, and/or a ML-Compatibility-Response.

At 634, the source gNB (610) may transmit, to the UE (605), an RRCReconfiguration message, which may include the HO configuration with updated ML model and/or the ML-Compatibility-Response. At 636, the UE (605) may transmit, to the source gNB (610), an RRCReconfiguration-Complete message.

Optionally, at 638, the UE (605) may generate a data collection report, if it is configured to do so. At 640, the UE (605) may initiate data collection, if configured. At 642, the UE (605) may transmit, to the source gNB (610) a UE ML compatibility report, which may include data collection results. At 644, the source gNB (610) may transmit, to the target gNB (615), an HO update, which may include the data collection results. At 646 the target gNB (615) may perform ML update based on the data collection results.

At 648, the UE (605) may determine that the HO execution condition is met. In response, the UE (605) may execute HO with ML enabled function. At 650, the UE (605) may transmit, to the target gNB (615), a handover complete message, which may include an HO report with ML specific results. At 6522, the target gNB (615) may share, with the source gNB (610), the results of the HO, for example the HO report with ML specific results.

It may be noted that, in the examples of FIGS. 5-6, when both the UE and network side ML models are required to be updated, the messages in Scenario 1 (520) and Scenario 2 (620) may be combined or executed together.

FIG. 7 illustrates the potential steps of an example method 700. The example method 700 may include: initiating performance of at least one function enabled with a first model, 710; receiving, from a source base station, at least one model compatibility configuration, 720; determining whether the at least one function is compatible with a second model of at least one target base station based, at least partially, on the at least one model compatibility configuration, 730; transmitting, to the at least one target base station, at least one report, wherein the at least one report comprises, at least, an indication of a result of whether the at least one function is compatible with the second model of the at least one target base station, 740; and receiving, in response to the report, a conditional handover configuration, wherein the conditional handover configuration comprises, at least, an indication to at least one of: perform data collection, update the first model, or switch the first model with another model, 750. The example method 700 may be performed, for example, by a UE.

FIG. 8 illustrates the potential steps of an example method 800. The example method 800 may include: receiving, from a source base station, a handover request with respect to a user equipment, in a cell of the source base station, that is performing at least one function enabled with a first model, wherein the handover request comprises at least one report, wherein the at least one report comprises, at least, an indication of whether the at least one function is compatible with a second model of the apparatus, 810; determining a handover configuration for the user equipment, wherein the handover configuration comprises, at least, an indication to at least one of: perform data collection, update the first model, or switch the first model with another model, 820; and providing the handover command for the user equipment, 830. The example method 800 may be performed, for example, by a base station, gNB, target gNB, etc.

FIG. 9 illustrates the potential steps of an example method 900. The example method 900 may include: receiving, from a source base station, a handover configuration with respect to at least one target base station, wherein the handover configuration is configured to cause the apparatus to perform data collection for a model compatibility evaluation procedure between a first model of the source base station and a second model of the at least one target base station, 910; obtaining data based, at least partially, on the handover configuration, 920; transmitting, to the source base station, the obtained data, 930; determining that a handover condition of the handover configuration is met, 940; and performing handover from the source base station to the at least one target base station, 950. The example method 900 may be performed, for example, by a UE.

FIG. 10 illustrates the potential steps of an example method 1000. The example method 1000 may include: determining whether at least one function enabled with a first model is compatible with a second model with respect to a handover procedure, 1010; causing at least one of: data collection, update of the first model, or switch of the first model with another model based, at least partially, on the determination of whether the at least one function is compatible with a second model, 1020; providing the user equipment with a handover configuration, wherein the handover configuration is configured to cause the user equipment to perform data collection, 1030; receiving data collected with the user equipment, 1040; and causing update of the first model, 1050. The example method 1000 may be performed, for example, by a base station, gNB, source gNB, target gNB, etc.

In accordance with one example embodiment, an apparatus may comprise: at least one processor; and at least one memory storing instructions that, when executed by the at least one processor, cause the apparatus at least to: initiate performance of at least one function enabled with a first model; receive, from a source base station, at least one model compatibility configuration; determine whether the at least one function is compatible with a second model of at least one target base station based, at least partially, on the at least one model compatibility configuration; transmit, to the at least one target base station, at least one report, wherein the at least one report may comprise, at least, an indication of a result of whether the at least one function is compatible with the second model of the at least one target base station; and receive, in response to the report, a conditional handover configuration, wherein the conditional handover configuration may comprise, at least, an indication to at least one of: perform data collection, update the first model, or switch the first model with another model.

The at least one model compatibility configuration may be received via radio resource control signaling.

The at least one model compatibility configuration may comprise an indication of a process for updating the first model.

The at least one model compatibility configuration respectively may comprise an indication of usability, wherein the example apparatus may be further configured to: prioritize the at least one model compatibility configuration based on the respective indication of usability.

The at least one model compatibility configuration may be respectively associated with a target base station of the at least one target base station.

The example apparatus may be further configured to: determine that there is a difference between the first model and the second model based, at least partially, on one of: collected data, an obtained data patch, a comparison of an accuracy of the first model, with an accuracy of the second model, an evaluation of data drift between the first model and the second model, a comparison of an outcome of the first model with a predicted outcome of the second model, or a comparison of a measurement input to the first model with a predicted measurement for input to the second model.

The example apparatus may be further configured to: determine a time to perform update of the first model.

The example apparatus may be further configured to: determine a margin of error for performing update of the first model.

The example apparatus may be further configured to: determine whether an interruption of the at least one function is required to perform update of the first model.

The example apparatus may be further configured to: determine that a handover condition is met; perform handover from the source base station to the at least one target base station; and transmit, to the at least one target base station, a further report, wherein the further report may comprise an indication of at least one of: whether the second model is compatible with the at least one function, a difference between the first model and the second model, a switch of the first model to the other model, an update of the first model, whether update of the first model causes interruption of the at least one function, feedback with respect to data collection, feedback with respect to the update of the first model, feedback with respect to activation time of the other model, feedback with respect to at least one error metric, or feedback with respect to time to switch the first model to the other model.

The at least one report may be transmitted via one of: an uplink compatibility report message, or a radio resource control measurement report.

The at least one report may comprise at least one of: a reference signal received power error different with respect to the first model and the second model, an error metric associated with comparison of the first model and the second model, a distance based error metric associated with comparison of the first model and the second model, or a data drift associated with the first model and the second model.

The first model may comprise one of: a user equipment sided model, or a two sided model.

In accordance with one aspect, an example method may be provided comprising: with initiating, a user equipment, performance of at least one function enabled with a first model; receiving, from a source base station, at least one model compatibility configuration; determining whether the at least one function is compatible with a second model of at least one target base station based, at least partially, on the at least one model compatibility configuration; transmitting, to the at least one target base station, a report, wherein the report may comprise, at least, an indication of a result of whether the at least one function is compatible with the second model of the at least one target base station; and receiving, in response to the report, a conditional handover configuration, wherein the conditional handover configuration may comprise, at least, an indication to at least one of: perform data collection, update the first model, or switch the first model with another model.

In accordance with one example embodiment, an apparatus may comprise: circuitry configured to perform: initiating performance of at least one function enabled with a first model; circuitry configured to perform: receiving, from a source base station, at least one model compatibility configuration; circuitry configured to perform: determining whether the at least one function is compatible with a second model of at least one target base station based, at least partially, on the at least one model compatibility configuration; circuitry configured to perform: transmitting, to the at least one target base station, a report, wherein the report may comprise, at least, an indication of a result of whether the at least one function is compatible with the second model of the at least one target base station; and circuitry configured to perform: receiving, in response to the report, a conditional handover configuration, wherein the conditional handover configuration may comprise, at least, an indication to at least one of: perform data collection, update the first model, or switch the first model with another model.

In accordance with one example embodiment, an apparatus may comprise: processing circuitry; memory circuitry including computer program code, the memory circuitry and the computer program code configured to, with the processing circuitry, enable the apparatus to: initiate performance of at least one function enabled with a first model; receive, from a source base station, at least one model compatibility configuration; determine whether the at least one function is compatible with a second model of at least one target base station based, at least partially, on the at least one model compatibility configuration; transmit, to the at least one target base station, at least one report, wherein the at least one report may comprise, at least, an indication of a result of whether the at least one function is compatible with the second model of the at least one target base station; and receive, in response to the report, a conditional handover configuration, wherein the conditional handover configuration may comprise, at least, an indication to at least one of: perform data collection, update the first model, or switch the first model with another model.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog hardware circuit (s) with and/or digital software/firmware and (ii) any portions of hardware processor (s) with software (including digital signal processor (s)), software, and memory (ies) that work together to cause an apparatus, such as a mobile phone or server, to perform various functions) and (c) hardware circuit (s) and or processor (s), such as a microprocessor (s) portion of a microprocessor (s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: initiating performance of at least one function enabled with a first model; receiving, from a source base station, at least one model compatibility configuration; determining whether the at least one function is compatible with a second model of at least one target base station based, at least partially, on the at least one model compatibility configuration; transmitting, to the at least one target base station, a report, wherein the report may comprise, at least, an indication of a result of whether the at least one function is compatible with the second model of the at least one target base station; and receiving, in response to the report, a conditional handover configuration, wherein the conditional handover configuration may comprise, at least, an indication to at least one of: perform data collection, update the first model, or switch the first model with another model.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: initiate performance of at least one function enabled with a first model; cause receiving, from a source base station, of at least one model compatibility configuration; determine whether the at least one function is compatible with a second model of at least one target base station based, at least partially, on the at least one model compatibility configuration; cause transmitting, to the at least one target base station, of a report, wherein the report may comprise, at least, an indication of a result of whether the at least one function is compatible with the second model of the at least one target base station; and cause receiving, in response to the report, of a conditional handover configuration, wherein the conditional handover configuration may comprise, at least, an indication to at least one of: perform data collection, update the first model, or switch the first model with another model.

In accordance with one example embodiment, a non-transitory computer-readable medium comprising program instructions stored thereon for performing at least the following: initiating performance of at least one function enabled with a first model; causing receiving, from a source base station, of at least one model compatibility configuration; determining whether the at least one function is compatible with a second model of at least one target base station based, at least partially, on the at least one model compatibility configuration; causing transmitting, to the at least one target base station, of a report, wherein the report may comprise, at least, an indication of a result of whether the at least one function is compatible with the second model of the at least one target base station; and causing receiving, in response to the report, of a conditional handover configuration, wherein the conditional handover configuration may comprise, at least, an indication to at least one of: perform data collection, update the first model, or switch the first model with another model.

In accordance with another example embodiment, a non-transitory program storage device readable by a machine may be provided, tangibly embodying instructions executable by the machine for performing operations, the operations comprising: initiating performance of at least one function enabled with a first model; causing receiving, from a source base station, of at least one model compatibility configuration; determining whether the at least one function is compatible with a second model of at least one target base station based, at least partially, on the at least one model compatibility configuration; causing transmitting, to the at least one target base station, of a report, wherein the report may comprise, at least, an indication of a result of whether the at least one function is compatible with the second model of the at least one target base station; and causing receiving, in response to the report, of a conditional handover configuration, wherein the conditional handover configuration may comprise, at least, an indication to at least one of: perform data collection, update the first model, or switch the first model with another model.

In accordance with another example embodiment, a non-transitory computer-readable medium comprising instructions that, when executed by an apparatus, cause the apparatus to perform at least the following: initiating performance of at least one function enabled with a first model; causing receiving, from a source base station, of at least one model compatibility configuration; determining whether the at least one function is compatible with a second model of at least one target base station based, at least partially, on the at least one model compatibility configuration; causing transmitting, to the at least one target base station, of a report, wherein the report may comprise, at least, an indication of a result of whether the at least one function is compatible with the second model of the at least one target base station; and causing receiving, in response to the report, of a conditional handover configuration, wherein the conditional handover configuration may comprise, at least, an indication to at least one of: perform data collection, update the first model, or switch the first model with another model.

A computer implemented system comprising: at least one processor and at least one non-transitory memory storing instructions that, when executed by the at least one processor, cause the system at least to perform: initiating performance of at least one function enabled with a first model; causing receiving, from a source base station, of at least one model compatibility configuration; determining whether the at least one function is compatible with a second model of at least one target base station based, at least partially, on the at least one model compatibility configuration; causing transmitting, to the at least one target base station, of a report, wherein the report may comprise, at least, an indication of a result of whether the at least one function is compatible with the second model of the at least one target base station; and causing receiving, in response to the report, of a conditional handover configuration, wherein the conditional handover configuration may comprise, at least, an indication to at least one of: perform data collection, update the first model, or switch the first model with another model.

A computer implemented system comprising: means for initiating performance of at least one function enabled with a first model; means for causing receiving, from a source base station, of at least one model compatibility configuration; means for determining whether the at least one function is compatible with a second model of at least one target base station based, at least partially, on the at least one model compatibility configuration; means for causing transmitting, to the at least one target base station, of a report, wherein the report may comprise, at least, an indication of a result of whether the at least one function is compatible with the second model of the at least one target base station; and means for causing receiving, in response to the report, of a conditional handover configuration, wherein the conditional handover configuration may comprise, at least, an indication to at least one of: perform data collection, update the first model, or switch the first model with another model.

In accordance with one example embodiment, an apparatus may comprise: at least one processor; and at least one memory storing instructions that, when executed by the at least one processor, cause the apparatus at least to: receive, from a source base station, a handover request with respect to a user equipment, in a cell of the source base station, that is performing at least one function enabled with a first model, wherein the handover request may comprise at least one report, wherein the at least one report may comprise, at least, an indication of whether the at least one function is compatible with a second model of the apparatus; determine a handover configuration for the user equipment, wherein the handover configuration may comprise, at least, an indication to at least one of: perform data collection, update the first model, or switch the first model with another model; and provide the handover command for the user equipment.

The handover request may comprise a conditional handover request, wherein the handover configuration may comprise a conditional handover configuration.

The example apparatus may be further configured to: receive, from the user equipment, a handover complete message, wherein the handover complete message may comprise an indication of at least one of: whether the second model is compatible with the at least one function, a difference between the first model and the second model, a switch of the first model to another other model, an update of the first model, whether update of the first model causes interruption of the at least one function, feedback with respect to data collection, feedback with respect to the update of the first model, feedback with respect to activation time of the other model, feedback with respect to at least one error metric, or feedback with respect to time to switch the first model to the other model; and forward, to the source base station, the indication.

The at least one report may further comprise at least one of: a reference signal received power error different with respect to the first model and the second model, an error metric associated with comparison of the first model and the second model, a distance based error metric associated with comparison of the first model and the second model, or a data drift associated with the first model and the second model.

The first model may comprise one of: a user equipment sided model, or a two sided model.

The handover request may further comprise at least one of: an indication of a priority of the handover request, a request to provide the user equipment with a configuration for performing the at least one function with the second model, a request to send information regarding the handover configuration, a worst case activation latency, an identifier of the other model, or information associated with data collection.

The handover configuration may further comprise an indication of at least one of: a data collection period, a number of samples for data collection, model training information, model update information, an identifier of the other model, or worst case activation latency.

In accordance with one aspect, an example method may be provided comprising: receiving, with a target base station from a source base station, a handover request with respect to a user equipment, in a cell of the source base station, that is performing at least one function enabled with a first model, wherein the handover request may comprise at least one report, wherein the at least one report may comprise, at least, an indication of whether the at least one function is compatible with a second model of the target base station; determining a handover configuration for the user equipment, wherein the handover configuration may comprise, at least, an indication to at least one of: perform data collection, update the first model, or switch the first model with another model; and providing the handover command for the user equipment.

In accordance with one example embodiment, an apparatus may comprise: circuitry configured to perform: receiving, from a source base station, a handover request with respect to a user equipment, in a cell of the source base station, that is performing at least one function enabled with a first model, wherein the handover request may comprise at least one report, wherein the at least one report may comprise, at least, an indication of whether the at least one function is compatible with a second model of the target base station; circuitry configured to perform: determining a handover configuration for the user equipment, wherein the handover configuration may comprise, at least, an indication to at least one of: perform data collection, update the first model, or switch the first model with another model; and circuitry configured to perform: providing the handover command for the user equipment.

In accordance with one example embodiment, an apparatus may comprise: processing circuitry; memory circuitry including computer program code, the memory circuitry and the computer program code configured to, with the processing circuitry, enable the apparatus to: receive, from a source base station, a handover request with respect to a user equipment, in a cell of the source base station, that is performing at least one function enabled with a first model, wherein the handover request may comprise at least one report, wherein the at least one report may comprise, at least, an indication of whether the at least one function is compatible with a second model of the apparatus; determine a handover configuration for the user equipment, wherein the handover configuration may comprise, at least, an indication to at least one of: perform data collection, update the first model, or switch the first model with another model; and provide the handover command for the user equipment.

In accordance with one example embodiment, an apparatus may comprise means for performing: receiving, from a source base station, a handover request with respect to a user equipment, in a cell of the source base station, that is performing at least one function enabled with a first model, wherein the handover request may comprise at least one report, wherein the at least one report may comprise, at least, an indication of whether the at least one function is compatible with a second model of the apparatus; determining a handover configuration for the user equipment, wherein the handover configuration may comprise, at least, an indication to at least one of: perform data collection, update the first model, or switch the first model with another model; and providing the handover command for the user equipment.

In accordance with one example embodiment, a non-transitory computer-readable medium comprising instructions stored thereon which, when executed with at least one processor, cause the at least one processor to: cause receiving, with a target base station from a source base station, of a handover request with respect to a user equipment, in a cell of the source base station, that is performing at least one function enabled with a first model, wherein the handover request may comprise at least one report, wherein the at least one report may comprise, at least, an indication of whether the at least one function is compatible with a second model of the target base station; determine a handover configuration for the user equipment, wherein the handover configuration may comprise, at least, an indication to at least one of: perform data collection, update the first model, or switch the first model with another model; and cause providing of the handover command for the user equipment.

In accordance with one example embodiment, a non-transitory computer-readable medium comprising program instructions stored thereon for performing at least the following: causing receiving, with a target base station from a source base station, of a handover request with respect to a user equipment, in a cell of the source base station, that is performing at least one function enabled with a first model, wherein the handover request may comprise at least one report, wherein the at least one report may comprise, at least, an indication of whether the at least one function is compatible with a second model of the target base station; determining a handover configuration for the user equipment, wherein the handover configuration may comprise, at least, an indication to at least one of: perform data collection, update the first model, or switch the first model with another model; and causing providing of the handover command for the user equipment.

In accordance with another example embodiment, a non-transitory program storage device readable by a machine may be provided, tangibly embodying instructions executable by the machine for performing operations, the operations comprising: causing receiving, with a target base station from a source base station, of a handover request with respect to a user equipment, in a cell of the source base station, that is performing at least one function enabled with a first model, wherein the handover request may comprise at least one report, wherein the at least one report may comprise, at least, an indication of whether the at least one function is compatible with a second model of the target base station; determining a handover configuration for the user equipment, wherein the handover configuration may comprise, at least, an indication to at least one of: perform data collection, update the first model, or switch the first model with another model; and causing providing of the handover command for the user equipment.

In accordance with another example embodiment, a non-transitory computer-readable medium comprising instructions that, when executed by an apparatus, cause the apparatus to perform at least the following: causing receiving, with a target base station from a source base station, of a handover request with respect to a user equipment, in a cell of the source base station, that is performing at least one function enabled with a first model, wherein the handover request may comprise at least one report, wherein the at least one report may comprise, at least, an indication of whether the at least one function is compatible with a second model of the target base station; determining a handover configuration for the user equipment, wherein the handover configuration may comprise, at least, an indication to at least one of: perform data collection, update the first model, or switch the first model with another model; and causing providing of the handover command for the user equipment.

A computer implemented system comprising: at least one processor and at least one non-transitory memory storing instructions that, when executed by the at least one processor, cause the system at least to perform: causing receiving, with a target base station from a source base station, of a handover request with respect to a user equipment, in a cell of the source base station, that is performing at least one function enabled with a first model, wherein the handover request may comprise at least one report, wherein the at least one report may comprise, at least, an indication of whether the at least one function is compatible with a second model of the target base station; determining a handover configuration for the user equipment, wherein the handover configuration may comprise, at least, an indication to at least one of: perform data collection, update the first model, or switch the first model with another model; and causing providing of the handover command for the user equipment.

A computer implemented system comprising: means for causing receiving, with a target base station from a source base station, of a handover request with respect to a user equipment, in a cell of the source base station, that is performing at least one function enabled with a first model, wherein the handover request may comprise at least one report, wherein the at least one report may comprise, at least, an indication of whether the at least one function is compatible with a second model of the target base station; means for determining a handover configuration for the user equipment, wherein the handover configuration may comprise, at least, an indication to at least one of: perform data collection, update the first model, or switch the first model with another model; and means for causing providing of the handover command for the user equipment.

In accordance with one example embodiment, an apparatus may comprise: at least one processor; and at least one memory storing instructions that, when executed by the at least one processor, cause the apparatus at least to: receive, from a source base station, a handover configuration with respect to at least one target base station, wherein the handover configuration may be configured to cause the apparatus to perform data collection for a model compatibility evaluation procedure between a first model of the source base station and a second model of the at least one target base station; obtain data based, at least partially, on the handover configuration; transmit, to the source base station, the obtained data; determine that a handover condition of the handover configuration is met; and perform handover from the source base station to the at least one target base station.

In accordance with one aspect, an example method may be provided comprising: receiving, with a user equipment from a source base station, a handover configuration with respect to at least one target base station, wherein the handover configuration may be configured to cause the user equipment to perform data collection for a model compatibility evaluation procedure between a first model of the source base station and a second model of the at least one target base station; obtaining data based, at least partially, on the handover configuration; transmitting, to the source base station, the obtained data; determining that a handover condition of the handover configuration is met; and performing handover from the source base station to the at least one target base station.

In accordance with one example embodiment, an apparatus may comprise: circuitry configured to perform: receiving, from a source base station, a handover configuration with respect to at least one target base station, wherein the handover configuration may be configured to cause the user equipment to perform data collection for a model compatibility evaluation procedure between a first model of the source base station and a second model of the at least one target base station; circuitry configured to perform: obtaining data based, at least partially, on the handover configuration; circuitry configured to perform: transmitting, to the source base station, the obtained data; determining that a handover condition of the handover configuration is met; and circuitry configured to perform: performing handover from the source base station to the at least one target base station.

In accordance with one example embodiment, an apparatus may comprise: processing circuitry; memory circuitry including computer program code, the memory circuitry and the computer program code configured to, with the processing circuitry, enable the apparatus to: receive, from a source base station, a handover configuration with respect to at least one target base station, wherein the handover configuration may be configured to cause the apparatus to perform data collection for a model compatibility evaluation procedure between a first model of the source base station and a second model of the at least one target base station; obtain data based, at least partially, on the handover configuration; transmit, to the source base station, the obtained data; determine that a handover condition of the handover configuration is met; and perform handover from the source base station to the at least one target base station.

In accordance with one example embodiment, an apparatus may comprise means for performing: receiving, from a source base station, a handover configuration with respect to at least one target base station, wherein the handover configuration may be configured to cause the apparatus to perform data collection for a model compatibility evaluation procedure between a first model of the source base station and a second model of the at least one target base station; obtaining data based, at least partially, on the handover configuration; transmitting, to the source base station, the obtained data; determining that a handover condition of the handover configuration is met; and performing handover from the source base station to the at least one target base station.

In accordance with one example embodiment, a non-transitory computer-readable medium comprising instructions stored thereon which, when executed with at least one processor, cause the at least one processor to: cause receiving, with a user equipment from a source base station, of a handover configuration with respect to at least one target base station, wherein the handover configuration may be configured to cause the user equipment to perform data collection for a model compatibility evaluation procedure between a first model of the source base station and a second model of the at least one target base station; cause obtaining of data based, at least partially, on the handover configuration; cause transmitting, to the source base station, of the obtained data; determine that a handover condition of the handover configuration is met; and perform handover from the source base station to the at least one target base station.

In accordance with one example embodiment, a non-transitory computer-readable medium comprising program instructions stored thereon for performing at least the following: causing receiving, with a user equipment from a source base station, of a handover configuration with respect to at least one target base station, wherein the handover configuration may be configured to cause the user equipment to perform data collection for a model compatibility evaluation procedure between a first model of the source base station and a second model of the at least one target base station; causing obtaining of data based, at least partially, on the handover configuration; causing transmitting, to the source base station, of the obtained data; determining that a handover condition of the handover configuration is met; and performing handover from the source base station to the at least one target base station.

In accordance with another example embodiment, a non-transitory program storage device readable by a machine may be provided, tangibly embodying instructions executable by the machine for performing operations, the operations comprising: causing receiving, with a user equipment from a source base station, of a handover configuration with respect to at least one target base station, wherein the handover configuration may be configured to cause the user equipment to perform data collection for a model compatibility evaluation procedure between a first model of the source base station and a second model of the at least one target base station; causing obtaining of data based, at least partially, on the handover configuration; causing transmitting, to the source base station, of the obtained data; determining that a handover condition of the handover configuration is met; and performing handover from the source base station to the at least one target base station.

In accordance with another example embodiment, a non-transitory computer-readable medium comprising instructions that, when executed by an apparatus, cause the apparatus to perform at least the following: causing receiving, with a user equipment from a source base station, of a handover configuration with respect to at least one target base station, wherein the handover configuration may be configured to cause the user equipment to perform data collection for a model compatibility evaluation procedure between a first model of the source base station and a second model of the at least one target base station; causing obtaining of data based, at least partially, on the handover configuration; causing transmitting, to the source base station, of the obtained data; determining that a handover condition of the handover configuration is met; and performing handover from the source base station to the at least one target base station.

A computer implemented system comprising: at least one processor and at least one non-transitory memory storing instructions that, when executed by the at least one processor, cause the system at least to perform: causing receiving, with a user equipment from a source base station, of a handover configuration with respect to at least one target base station, wherein the handover configuration may be configured to cause the user equipment to perform data collection for a model compatibility evaluation procedure between a first model of the source base station and a second model of the at least one target base station; causing obtaining of data based, at least partially, on the handover configuration; causing transmitting, to the source base station, of the obtained data; determining that a handover condition of the handover configuration is met; and performing handover from the source base station to the at least one target base station.

A computer implemented system comprising: means for causing receiving, with a user equipment from a source base station, of a handover configuration with respect to at least one target base station, wherein the handover configuration may be configured to cause the user equipment to perform data collection for a model compatibility evaluation procedure between a first model of the source base station and a second model of the at least one target base station; means for causing obtaining of data based, at least partially, on the handover configuration; means for causing transmitting, to the source base station, of the obtained data; means for determining that a handover condition of the handover configuration is met; and means for performing handover from the source base station to the at least one target base station.

In accordance with one example embodiment, an apparatus may comprise: at least one processor; and at least one memory storing instructions that, when executed by the at least one processor, cause the apparatus at least to: determine whether at least one function enabled with a first model is compatible with a second model with respect to a handover procedure; cause at least one of: data collection, update of the first model, or switch of the first model with another model based, at least partially, on the determination of whether the at least one function is compatible with a second model; provide the user equipment with a handover configuration, wherein the handover configuration may be configured to cause the user equipment to perform data collection; receive data collected with the user equipment; and cause update of the first model.

The example apparatus may be further configured to: determine that there is a difference between the first model and the second model based, at least partially, on one of: collected data, an obtained data patch, a comparison of an accuracy of the first model, with an accuracy of the second model, an evaluation of data drift between the first model and the second model, a comparison of an outcome of the first model with a predicted outcome of the second model, or a comparison of a measurement input to the first model with a predicted measurement for input to the second model.

The example apparatus may be further configured to: determine a time to perform update of the first model.

The example apparatus may be further configured to: determine a margin of error for performing update of the first model.

The example apparatus may be further configured to: determine whether an interruption of the at least one function is required to perform update of the first model.

The first model may comprise one of: a network sided model, or a two sided model.

The apparatus may comprise a source base station associated with the first model.

The apparatus may comprise a target base station associated with the second model.

In accordance with one aspect, an example method may be provided comprising: determining, with a base station, whether at least one function enabled with a first model is compatible with a second model with respect to a handover procedure; causing at least one of: data collection, update of the first model, or switch of the first model with another model based, at least partially, on the determination of whether the at least one function is compatible with a second model; providing the user equipment with a handover configuration, wherein the handover configuration may be configured to cause the user equipment to perform data collection; receiving data collected with the user equipment; and causing update of the first model.

In accordance with one example embodiment, an apparatus may comprise: circuitry configured to perform: determining whether at least one function enabled with a first model is compatible with a second model with respect to a handover procedure; causing at least one of: data collection, update of the first model, or switch of the first model with another model based, at least partially, on the determination of whether the at least one function is compatible with a second model; circuitry configured to perform: providing the user equipment with a handover configuration, wherein the handover configuration may be configured to cause the user equipment to perform data collection; circuitry configured to perform: receiving data collected with the user equipment; and circuitry configured to perform: causing update of the first model.

In accordance with one example embodiment, an apparatus may comprise: processing circuitry; memory circuitry including computer program code, the memory circuitry and the computer program code configured to, with the processing circuitry, enable the apparatus to: determine whether at least one function enabled with a first model is compatible with a second model with respect to a handover procedure; cause at least one of: data collection, update of the first model, or switch of the first model with another model based, at least partially, on the determination of whether the at least one function is compatible with a second model; provide the user equipment with a handover configuration, wherein the handover configuration may be configured to cause the user equipment to perform data collection; receive data collected with the user equipment; and cause update of the first model.

In accordance with one example embodiment, an apparatus may comprise means for performing: determining whether at least one function enabled with a first model is compatible with a second model with respect to a handover procedure; causing at least one of: data collection, update of the first model, or switch of the first model with another model based, at least partially, on the determination of whether the at least one function is compatible with a second model; providing the user equipment with a handover configuration, wherein the handover configuration may be configured to cause the user equipment to perform data collection; receiving data collected with the user equipment; and causing update of the first model.

In accordance with one example embodiment, a non-transitory computer-readable medium comprising instructions stored thereon which, when executed with at least one processor, cause the at least one processor to: determine whether at least one function enabled with a first model is compatible with a second model with respect to a handover procedure; cause at least one of: data collection, update of the first model, or switch of the first model with another model based, at least partially, on the determination of whether the at least one function is compatible with a second model; cause providing the user equipment with a handover configuration, wherein the handover configuration may be configured to cause the user equipment to perform data collection; cause receiving of data collected with the user equipment; and cause update of the first model.

In accordance with one example embodiment, a non-transitory computer-readable medium comprising program instructions stored thereon for performing at least the following: determining whether at least one function enabled with a first model is compatible with a second model with respect to a handover procedure; causing at least one of: data collection, update of the first model, or switch of the first model with another model based, at least partially, on the determination of whether the at least one function is compatible with a second model; causing providing the user equipment with a handover configuration, wherein the handover configuration may be configured to cause the user equipment to perform data collection; causing receiving of data collected with the user equipment; and causing update of the first model.

In accordance with another example embodiment, a non-transitory program storage device readable by a machine may be provided, tangibly embodying instructions executable by the machine for performing operations, the operations comprising: determining whether at least one function enabled with a first model is compatible with a second model with respect to a handover procedure; causing at least one of: data collection, update of the first model, or switch of the first model with another model based, at least partially, on the determination of whether the at least one function is compatible with a second model; causing providing the user equipment with a handover configuration, wherein the handover configuration may be configured to cause the user equipment to perform data collection; causing receiving of data collected with the user equipment; and causing update of the first model.

In accordance with another example embodiment, a non-transitory computer-readable medium comprising instructions that, when executed by an apparatus, cause the apparatus to perform at least the following: determining whether at least one function enabled with a first model is compatible with a second model with respect to a handover procedure; causing at least one of: data collection, update of the first model, or switch of the first model with another model based, at least partially, on the determination of whether the at least one function is compatible with a second model; causing providing the user equipment with a handover configuration, wherein the handover configuration may be configured to cause the user equipment to perform data collection; causing receiving of data collected with the user equipment; and causing update of the first model.

A computer implemented system comprising: at least one processor and at least one non-transitory memory storing instructions that, when executed by the at least one processor, cause the system at least to perform: determining whether at least one function enabled with a first model is compatible with a second model with respect to a handover procedure; causing at least one of: data collection, update of the first model, or switch of the first model with another model based, at least partially, on the determination of whether the at least one function is compatible with a second model; causing providing the user equipment with a handover configuration, wherein the handover configuration may be configured to cause the user equipment to perform data collection; causing receiving of data collected with the user equipment; and causing update of the first model.

A computer implemented system comprising: means for determining whether at least one function enabled with a first model is compatible with a second model with respect to a handover procedure; means for causing at least one of: data collection, update of the first model, or switch of the first model with another model based, at least partially, on the determination of whether the at least one function is compatible with a second model; means for causing providing the user equipment with a handover configuration, wherein the handover configuration may be configured to cause the user equipment to perform data collection; means for causing receiving of data collected with the user equipment; and means for causing update of the first model.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination (s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:

at least one processor; and at least one non-transitory memory storing instructions that, when executed by the at least one processor, cause the apparatus at least to:

initiate performance of at least one function enabled with a first model;

receive, from a source base station, at least one model compatibility configuration;

determine whether the at least one function is compatible with a second model of at least one target base station based, at least partially, on the at least one model compatibility configuration;

transmit, to the at least one target base station, at least one report, wherein the at least one report comprises, at least, an indication of a result of whether the at least one function is compatible with the second model of the at least one target base station; and receive, in response to the report, a conditional handover configuration, wherein the conditional handover configuration comprises, at least, an indication to at least one of:

perform data collection, update the first model, or switch the first model with another model.

2. The apparatus of claim 1, wherein the at least one model compatibility configuration is received via radio resource control signaling.

3. The apparatus of claim 1, wherein the at least one model compatibility configuration comprises an indication of a process for updating the first model.

4. The apparatus of claim 1, wherein the at least one model compatibility configuration respectively comprises an indication of usability, wherein the at least one memory stores instructions that, when executed by the at least one processor, cause the apparatus to:

prioritize the at least one model compatibility configuration based on the respective indication of usability.

5. The apparatus of claim 1, wherein the at least one model compatibility configuration is respectively associated with a target base station of the at least one target base station.

6. The apparatus of claim 1, wherein the at least one memory stores instructions that, when executed by the at least one processor, cause the apparatus to:

determine that there is a difference between the first model and the second model based, at least partially, on one of:

collected data, an obtained data patch, a comparison of an accuracy of the first model, with an accuracy of the second model, an evaluation of data drift between the first model and the second model, a comparison of an outcome of the first model with a predicted outcome of the second model, or a comparison of a measurement input to the first model with a predicted measurement for input to the second model.

7. The apparatus of claim 1, wherein the at least one memory stores instructions that, when executed by the at least one processor, cause the apparatus to:

determine a time to perform update of the first model.

8. A method comprising:

initiating, with a user equipment, performance of at least one function enabled with a first model;

receiving, from a source base station, at least one model compatibility configuration;

determining whether the at least one function is compatible with a second model of at least one target base station based, at least partially, on the at least one model compatibility configuration;

transmitting, to the at least one target base station, a report, wherein the report comprises, at least, an indication of a result of whether the at least one function is compatible with the second model of the at least one target base station; and receiving, in response to the report, a conditional handover configuration, wherein the conditional handover configuration comprises, at least, an indication to at least one of:

perform data collection, update the first model, or switch the first model with another model.

9. The method of claim 8, wherein the at least one model compatibility configuration is received via radio resource control signaling.

10. The method of claim 8, wherein the at least one model compatibility configuration comprises an indication of a process for updating the first model.

11. The method of claim 8, wherein the at least one model compatibility configuration respectively comprises an indication of usability, and wherein the method comprising: prioritizing the at least one model compatibility configuration based on the respective indication of usability.

12. The method of claim 8, wherein the at least one model compatibility configuration is respectively associated with a target base station of the at least one target base station.

13. The method of claim 8, comprising: determining that there is a difference between the first model and the second model based, at least partially, on one of: collected data, an obtained data patch, a comparison of an accuracy of the first model, with an accuracy of the second model, an evaluation of data drift between the first model and the second model, a comparison of an outcome of the first model with a predicted outcome of the second model, or a comparison of a measurement input to the first model with a predicted measurement for input to the second model.

14. The method of claim 8, comprising: determining a time to perform update of the first model.

15. A non-transitory computer-readable medium comprising program instructions stored thereon for performing at least the following:

initiating performance of at least one function enabled with a first model;

causing receiving, from a source base station, of at least one model compatibility configuration;

determining whether the at least one function is compatible with a second model of at least one target base station based, at least partially, on the at least one model compatibility configuration;

causing transmitting, to the at least one target base station, of a report, wherein the report comprises, at least, an indication of a result of whether the at least one function is compatible with the second model of the at least one target base station; and causing receiving, in response to the report, of a conditional handover configuration, wherein the conditional handover configuration comprises, at least, an indication to at least one of:

perform data collection, update the first model, or switch the first model with another model.

16. The non-transitory computer-readable medium of claim 15, wherein the at least one model compatibility configuration is received via radio resource control signaling.

17. The non-transitory computer-readable medium of claim 15, wherein the at least one model compatibility configuration comprises an indication of a process for updating the first model.

18. The non-transitory computer-readable medium of claim 15, wherein the at least one model compatibility configuration respectively comprises an indication of usability, and wherein the non-transitory computer-readable medium comprises computer instructions for:

prioritizing the at least one model compatibility configuration based on the respective indication of usability.

19. The non-transitory computer-readable medium of claim 15, wherein the at least one model compatibility configuration is respectively associated with a target base station of the at least one target base station.

20. The non-transitory computer-readable medium of claim 15, wherein the non-transitory computer-readable medium comprises computer instructions for:

determining that there is a difference between the first model and the second model based, at least partially, on one of:

collected data, an obtained data patch, a comparison of an accuracy of the first model, with an accuracy of the second model, an evaluation of data drift between the first model and the second model, a comparison of an outcome of the first model with a predicted outcome of the second model, or a comparison of a measurement input to the first model with a predicted measurement for input to the second model.

* * * * *